(12) United States Patent
Rubel

(10) Patent No.: US 7,548,145 B2
(45) Date of Patent: Jun. 16, 2009

(54) HYSTERETIC MEMS THERMAL DEVICE AND METHOD OF MANUFACTURE

(75) Inventor: Paul J. Rubel, Santa Barbara, CA (US)

(73) Assignee: Innovative Micro Technology, Goleta, CA (US)

( * ) Notice: Subject to any disclaimer, the term of this patent is extended or adjusted under 35 U.S.C. 154(b) by 562 days.

(21) Appl. No.: 11/334,438

(22) Filed: Jan. 19, 2006

(65) Prior Publication Data

US 2007/0170811 A1   Jul. 26, 2007

(51) Int. Cl.
*H01H 51/22* (2006.01)
(52) U.S. Cl. .................. 335/78; 200/181; 310/307
(58) Field of Classification Search ............... 335/78; 200/181; 310/306–307; 60/527
See application file for complete search history.

(56) References Cited

U.S. PATENT DOCUMENTS

| | | |
|---|---|---|
| 5,796,152 A | 8/1998 | Carr et al. |
| 5,962,949 A | 10/1999 | Dhuler et al. |
| 6,360,539 B1 | 3/2002 | Hill et al. |
| 6,407,478 B1 * | 6/2002 | Wood et al. ............ 310/307 |
| 6,617,185 B1 | 9/2003 | Geisberger |
| 6,624,730 B2 * | 9/2003 | Johnson et al. ......... 335/78 |
| 7,036,312 B2 * | 5/2006 | Menard et al. ......... 60/527 |
| 7,253,709 B1 * | 8/2007 | Chang et al. .......... 335/78 |
| 7,349,236 B2 * | 3/2008 | Lin et al. ............. 365/129 |
| 2002/0021053 A1 | 2/2002 | Wood et al. |
| 2003/0024243 A1 | 2/2003 | Gianchandani et al. |
| 2004/0166602 A1 | 8/2004 | Wang et al. |
| 2004/0211178 A1 | 10/2004 | Menard et al. |
| 2004/0261412 A1 | 12/2004 | Hickey |
| 2005/0146404 A1 | 7/2005 | Yeatman |
| 2005/0189204 A1 * | 9/2005 | Yeatman et al. ........ 200/181 |

* cited by examiner

*Primary Examiner*—Elvin G Enad
*Assistant Examiner*—Bernard Rojas
(74) *Attorney, Agent, or Firm*—Jaquelin K. Spong

(57) ABSTRACT

A MEMS hysteretic thermal device may have a cantilevered beam which bends about one or more points in at least two substantially different directions. In one exemplary embodiment, the MEMS hysteretic thermal device is made from a first segment coupled to an anchor point, and also coupled to a second segment by a joint. Heating two respective drive beams causes the first segment to bend in a direction substantially about the anchor point and the second segment to bend in a direction substantially about the joint. By cooling the first drive beam faster than the second drive beam, the motion of the MEMS thermal device may be hysteretic. The MEMS hysteretic thermal device may be used for example, as an electrical switch or as a valve or piston.

25 Claims, 19 Drawing Sheets

Latch moves 10 um

Spring moves 17 um

Latch moves back

Spring moves back to final position

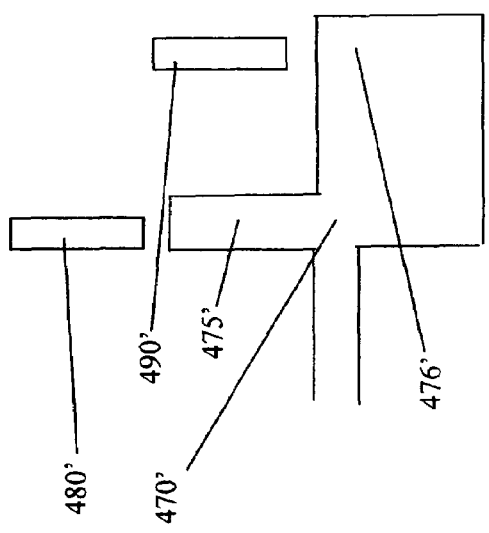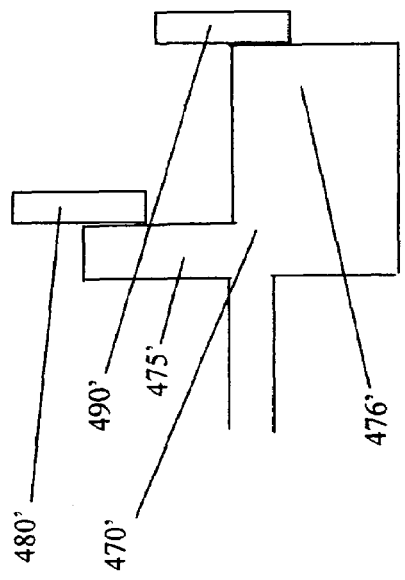

ional margin for tolerances of 3 μm.
HYSTERETIC MEMS THERMAL DEVICE AND METHOD OF MANUFACTURE

CROSS REFERENCE TO RELATED APPLICATIONS

This application is related to U.S. patent application Ser. No. 11/263,912, filed Nov. 2, 2005, which is hereby incorporated by reference in its entirety.

STATEMENT REGARDING FEDERALLY SPONSORED RESEARCH

Not applicable.

STATEMENT REGARDING MICROFICHE APPENDIX

Not applicable.

BACKGROUND

This invention relates to a microelectromechanical systems (MEMS) thermal device, and its method of manufacture. More particularly, this invention relates to a MEMS thermal actuator which is constructed with at least two segments, each segment pivoting about a different point, and with motion hysteresis between the heating phase and the cooling phase.

Microelectromechanical systems (MEMS) are very small moveable structures made on a substrate using lithographic processing techniques, such as those used to manufacture semiconductor devices. MEMS devices may be moveable actuators, valves, pistons, or switches, for example, with characteristic dimensions of a few microns to hundreds of microns. A moveable MEMS switch, for example, may be used to connect one or more input terminals to one or more output terminals, all microfabricated on a substrate. The actuation means for the moveable switch may be thermal, piezoelectric, electrostatic, or magnetic, for example.

FIG. 1 shows an example of a prior art thermal switch, such as that described in U.S. patent application Publication 2004/0211178 A1. The thermal switch 10 includes two cantilevers, 100 and 200. Each cantilever 100 and 200 contains a flexor beam 110 and 210, respectively, which pivot about fixed anchor points 155 and 255, respectively. A conductive circuit 120 and 220, is coupled to each flexor beam 110 and 210 by a plurality of dielectric tethers 150 and 250, respectively. When a voltage is applied between terminals 130 and 140, a current is driven through conductive circuit 120. The Joule heating generated by the current causes the circuit 120 to expand relative to the unheated flexor beam 110. Since the circuit is coupled to the flexor beam 110 by the dielectric tether 150, the expanding conductive circuit drives the flexor beam in the upward direction 165.

Applying a voltage between terminals 230 and 240 causes heat to be generated in circuit 220, which drives flexor beam 210 in the direction 265 shown in FIG. 1. Therefore, one beam 100 moves in direction 165 and the other beam 200 moves in direction 265. These movements may be used to open and close a set of contacts located on contact flanges 170 and 270, each in turn located on tip members 160 and 260, respectively. The sequence of movement of contact flanges 170 and 270 on tip members 160 and 260 of switch 10 is shown in FIGS. 2a-2d, to close and open the electrical switch 10.

To begin the closing sequence, in FIG. 2a, tip member 160 and contact flange 170 are moved about 10 μm in the direction 165 by the application of a voltage between terminals 130 and 140. In FIG. 2b, tip member 260 and contact flange 270 are moved about 17 μm in the direction 265 by application of a voltage between terminals 230 and 240. This distance is required to move twice the 5 μm width of the contacts, a 4 μm initial offset between the contact flanges 170 and 270, and additional margin for tolerances of 3 μm. In FIG. 2c, tip member 160 and contact flange 170 are brought back to their initial position by removing the voltage between terminals 130 and 140. This stops current from flowing and cools the cantilever 100 and it returns to its original position. In FIG. 2d, tip member 260 and contact flange 270 are brought back to nearly their original position by removing the voltage between terminals 230 and 240. However, in this position, tip member 160 and contact flange 170 prevent tip member 260 and contact flange 270 from moving completely back to their original positions, because of the mechanical interference between contact flanges 170 and 270. In this position, contact between the faces of contact flanges 170 and 270 provides an electrical connection between cantilevers 100 and 200, such that in FIG. 2d, the electrical switch is closed. Opening the electrical switch is accomplished by reversing the movements in the steps shown in FIGS. 2a-2d.

SUMMARY

The switch construction and method of manufacture may be simplified if a single MEMS actuator is capable of moving in two different directions, rather than having two MEMS actuators each moving in a single direction as shown. If a MEMS actuator is capable of moving in two different directions, then a MEMS switch using a fixed contact may be made using a single MEMS actuator. Furthermore, if the motion of the device is hysteretic, i.e. the motion is different upon heating than it is upon cooling, the actuator may be designed so as to latch in a détente position against the contact. If such an actuator can be designed, then the control of the switch may also be simplified, because only the single actuator may need to be controlled. Accordingly, it is desirable to design and fabricate a MEMS actuator which is capable of moving in two substantially different directions, and with motion which is hysteretic.

A MEMS device is described, which includes a cantilevered beam that bends about one or more points in at least two substantially different directions. The MEMS device also includes a driving means coupled to the cantilever, wherein the driving means may include a drive beam tethered to the cantilever by at least one tether. Upon heating the drive beam, the drive beam expands to deform the cantilever. Upon cooling the drive beam, a heat sink located near the anchor point causes the drive beam to cool with a different temperature profile than it did upon heating, and therefore the cantilever deflects along a different trajectory upon cooling than it did upon heating.

Embodiments of the MEMS device are described, which include a MEMS thermal actuator that may extend in two orthogonal directions by having at least two segments disposed orthogonally to each other. Each segment bends about a different point. Therefore, the MEMS hysteretic thermal actuator may have articulated motion, and be capable of moving in two substantially different directions.

Furthermore, the MEMS segmented thermal actuator may move along one trajectory while heating up, but may move in a second, substantially different trajectory while cooling down. In other words, the motion of the segmented thermal actuator may be hysteretic during the heating phase compared to the cooling phase. The segmented, hysteretic thermal actuator may therefore be used to close and latch an electrical switch, for example, as well as in any of a number of different applications, such as valves or pistons, which may require articulated, hysteretic motion.

Several embodiments of the MEMS segmented, hysteretic thermal actuator are disclosed. In a first embodiment, two substantially different directions of motion are achieved by including a substantially ninety-degree bend between two segments of a cool beam of the thermal actuator. A current-carrying element provides a hot beam, which expands relative to the cool beam. The current-carrying element is disposed adjacent to the two segments of the cool beam and heats up as current is driven through it. The current-carrying element expands upon heating, driving the first segment of the cool beam in one direction before the substantially ninety-degree bend, and driving the second segment of the cool beam in another direction after the substantially ninety-degree bend. Because the temperature profile of the beam depends on whether the beam is being heated or cooled, the beam moves differently upon heating than it does upon cooling, and therefore the motion is hysteretic.

In another exemplary embodiment, the MEMS segmented, hysteretic device consists of two segments and a rigid link joining the first segment to the second segment in an approximately rectilinear fashion. Upon heating an adjacent hot beam, the hot beam bends the first segment about its anchor point. Upon further heating, the hot beam bends the second segment about the rigid link. Upon cooling, the bending of the first segment about the anchor point relaxes before the second segment about the rigid link. Therefore, the motion of the MEMS segmented actuator is hysteretic, being different upon heating than upon cooling.

In yet another exemplary embodiment, the segments of the MEMS segmented, hysteretic device are oriented in two substantially different planes. A rigid link joins the two segments. A driving beam is a circuit which is disposed adjacent to the segments, such that the driving beam drives the device in two different planes of motion, one about the anchor point and the other about the rigid link.

These and other features and advantages are described in, or are apparent from, the following detailed description.

BRIEF DESCRIPTION OF THE DRAWINGS

Various exemplary details are described with reference to the accompanying drawings, which however, should not be taken to limit the invention to the specific embodiments shown but are for explanation and understanding only.

DETAILED DESCRIPTION

Although the systems and methods described herein are applied to an electrical switch, it should be understood that this is only one embodiment, and that the systems and methods may be appropriate for any number of devices, such as valves, pistons and other devices using actuators.

A MEMS hysteretic device is described, which includes a cantilevered beam that extends from an anchor point in at least two orthogonal directions. The MEMS hysteretic device also includes a driving means coupled to the cantilever, wherein the driving means may include a drive beam coupled to the cantilever by at least one tether. Upon heating the drive beam, the drive beam expands to deform the cantilever. Upon cooling the drive beam, a heat sink located near the anchor point causes the drive beam to cool with a different temperature profile than it did upon heating, and therefore the cantilever deflects along a different trajectory upon cooling than it did upon heating.

Figure 3:
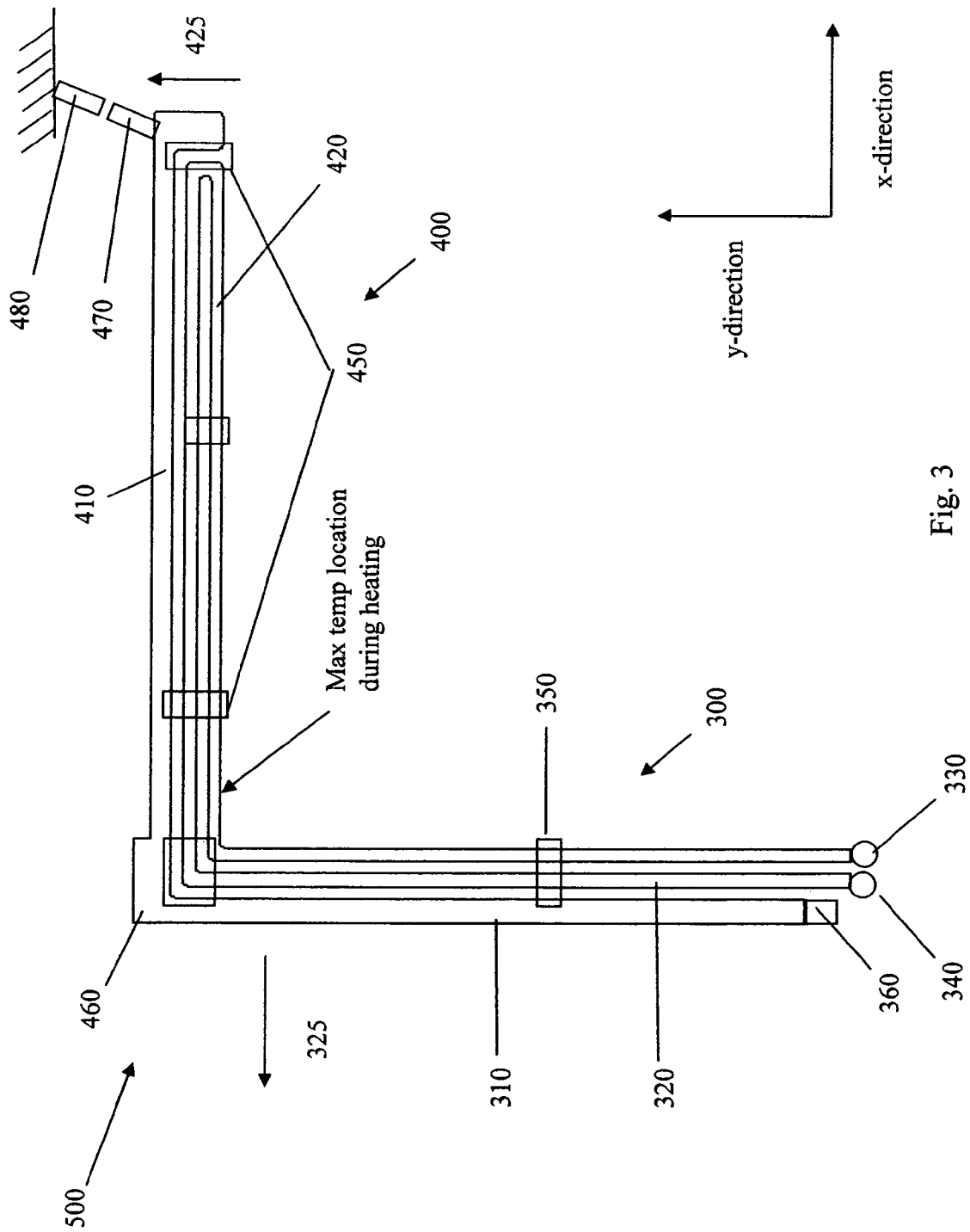
FIG. 3 is a diagram illustrating a first exemplary embodiment of a MEMS segmented thermal actuator.

FIG. 3 is a diagram illustrating a first exemplary embodiment of a MEMS hysteretic thermal actuator 500. MEMS hysteretic thermal actuator 500 includes two beam segments 300 and 400, which are joined at a substantially ninety-degree joint 460. The first segment 300 includes a first drive beam portion 320 disposed adjacent, and coupled to a first cool beam portion 310. Similarly, the second segment 400 includes a second drive beam portion 420 disposed adjacent, and coupled to a second cool beam portion 410. Current is input to the drive beam portions 320 and 420 at contacts 330 and 340, and the current circulating in the drive beam circuit heats portions 320 and 420 by joule heating. The drive beams 320 and 420 are mechanically coupled to the cool beam portions 310 and 410 by dielectric tethers 350 and 450, respectively. The dielectric tethers 350 and 450 may be made of any convenient, non-conducting material which couples the drive beam portions 320 and 420 to segmented cool beam portions 310 and 410 mechanically, but not electrically. In one embodiment, dielectric tethers 350 and 450 may be made from an epoxy-based photoresist such as SU-8, a negative photoresist developed by IBM of Armonk, NY.

The heat generated in the drive beam circuit flows out predominantly through the contacts 330 and 340, and to a lesser extent by radiation and convection to the closely spaced substrate, about 4 um from the drive beam circuit. Because heat is generated all along the drive beams 320 and 420, and flows out predominantly through the contacts 330 and 340 which act as heat sinks, the point in the drive beam circuit which is at the maximum temperature starts out being located adjacent to the ninety degree joint 460 or at a location approximately midway to the distal end of the drive beam 420. As the temperature continues to rise, however, the location of maximum temperature begins to move out along the drive beam circuit, away from contacts 330 and 340. If the duration of the current pulse is long enough, the point of maximum temperature will occur near the distal end of the drive circuit. The heat generated causes the first drive beam portion 320 and the second drive beam portion 420 to expand, which bends the first segment 300 in the negative x-direction 325 about the anchor point 360, and bends the second segment 400 in the positive y-direction 425 about the substantially ninety-degree joint 460.

When the current pulse ceases, the drive beam begins to cool. Since the dominant heat sink is located at the contacts 330 and 340, the first drive beam portion 320, located closer to the heat sink 330 and 340, cools faster than the second drive beam portion 420, which is located further from heat sinks 330 and 340. As a result, the first segment 300 of the MEMS hysteretic thermal actuator 500 relaxes before the second segment 400. Therefore, when the MEMS hysteretic thermal actuator 500 is heating, it bends in a trajectory that is different from the trajectory upon cooling, resulting in hysteretic behavior when the trajectory is plotted on a graph, as described below.

Figure 4:
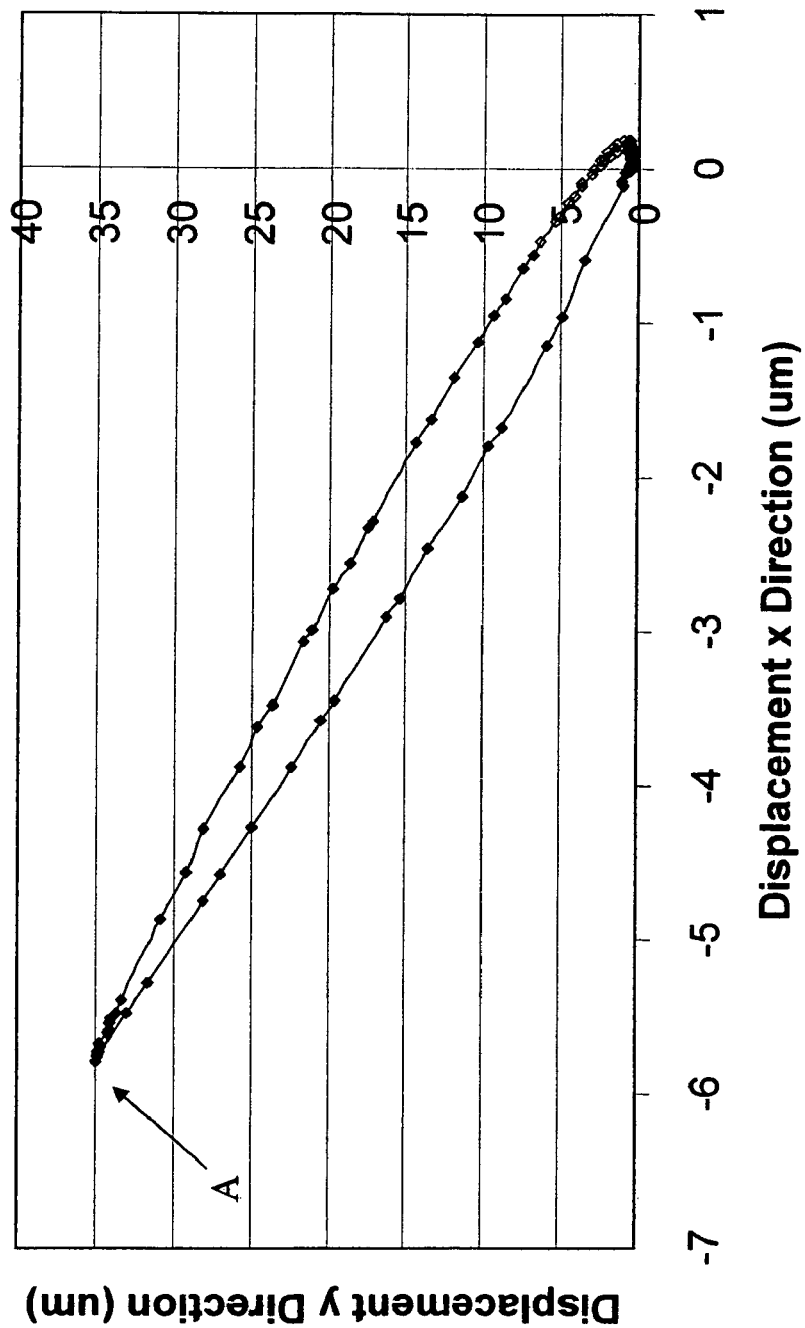
FIG. 4 is a plot of the results of a simulation predicting the behavior of the MEMS hysteretic thermal actuator of FIG. 3 in response to the application of a square wave current pulse.

FIG. 4 is a plot showing the results of a mathematical simulation using an ANSYS multi-physics finite element model, which simulates the deflection of the tip of the cool beam that results from the heating of the drive beam with a square wave current pulse. The current pulse used for FIG. 4 is 190 mA amplitude and 3 μsec duration. Each point in the plot corresponds to an equal increment of time. As shown in FIG. 4, the tip of the MEMS hysteretic thermal actuator 500 moves in the positive y-direction and the negative x-direction (the x- and y-axes are indicated in FIG. 3). The movement in the positive y-direction is accomplished largely by beam portion 400, and movement in the negative x-direction is accomplished largely by beam portion 300. The slope of the trajectory of the tip end is approximately −6, such that for every displacement of −1 μm in the negative x-direction, the y-displacement increases by about 6 μm. At the upper left of the displacement trajectory, at the point labeled A, the current pulse ceases, and the drive beam begins to cool. The cooling, as described above, relaxes the beam portion 300 first in the x-direction, followed by the beam portion 400 in the y-direction, so that the trajectory of the beams upon cooling is different than the trajectory of the beams upon heating. This is illustrated by the hysteresis seen in the curves shown in FIG. 4. The hysteresis is evident in the different slope of the upper trajectory compared to the lower trajectory. The slope of the upper trajectory is about 5.6 compared to the slope of about 6 for the lower trajectory. The nominal difference in the location of the tip end on the upper trajectory compared to the lower trajectory is on the order of about 5 μm for this current waveform. This hysteresis may be used to latch and unlatch the MEMS hysteretic actuator, when the actuator is used in a switch for example, as described further below.

Returning to FIG. 3, MEMS hysteretic thermal actuator 500 may be used to open and close an electrical switch. To implement this switch, MEMS hysteretic thermal actuator 500 is formed with a contact 470, which is adjacent to another contact 480 which is rigidly affixed to the substrate. The two contacts 470 and 480 may be made of different material than segmented beams 310, 320, 410 and 420. The contacts 470 and 480 may be made of a material which has a low contact resistance relative to the material of segmented beams 310, 320, 410 and 420. In one embodiment, the contacts 470 and 480 are gold, however, other materials such as gold-cobalt alloy, palladium, etc., may be used as well. In this embodiment, an electrical signal may flow from segmented beams 310 and 410 to contact 470 and then to contact 480 when the switch is closed. However, in another alternative embodiment described below with respect to FIGS. 19, 20a and 20b, the electrical signal may flow between two contacts located beyond the tip of segmented beam 410, rather than through segmented beam 410 to the contact.

Figure 1:
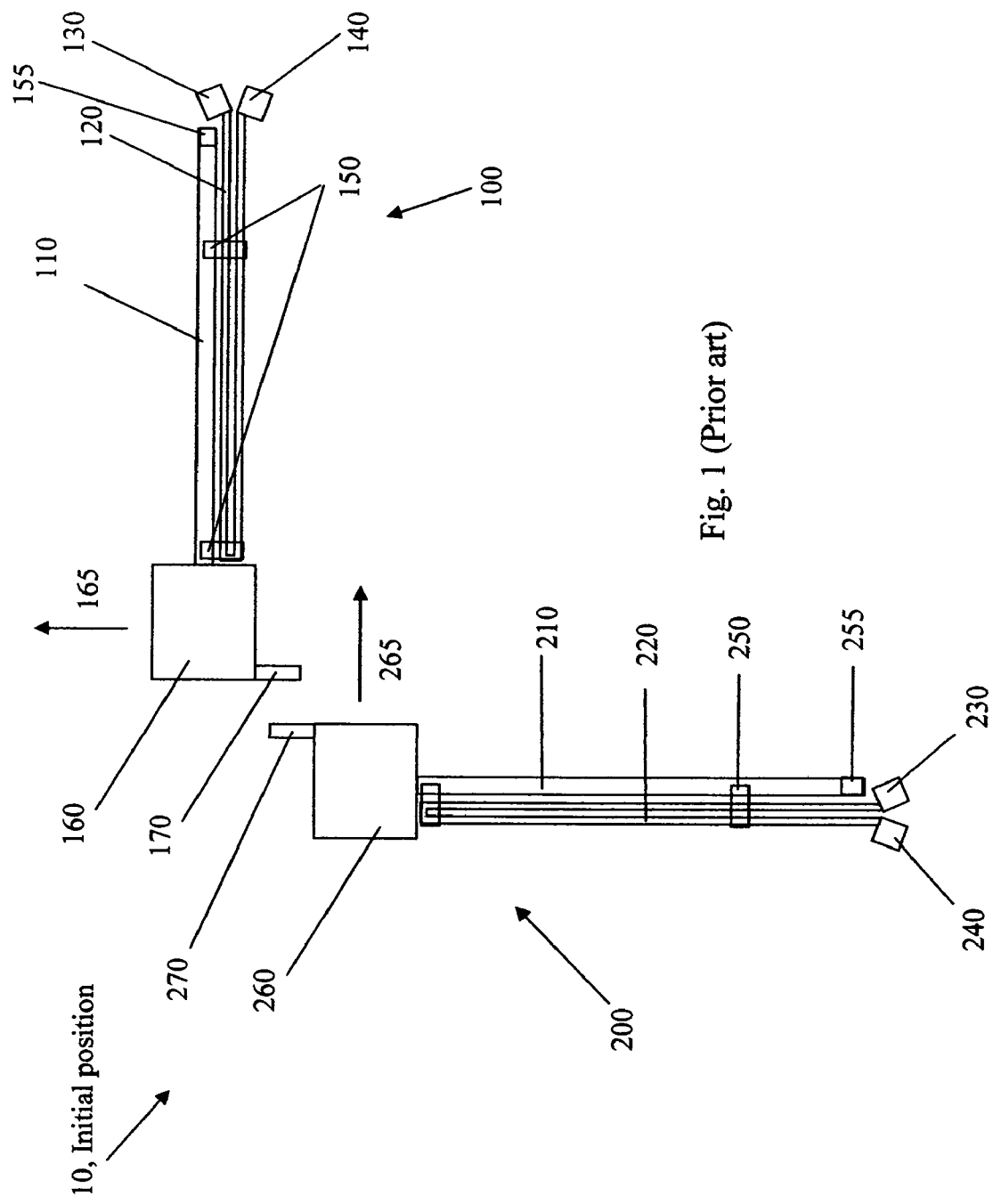
FIG. 1 is a schematic view of a prior art MEMS thermal switch.

In the quiescent state, the two contacts 470 and 480 of MEMS hysteretic thermal switch 500 may be located adjacent to each other, rather than one in front of the other as is the case with contact flanges 170 and 270 shown in FIG. 1.

Figure 2A:
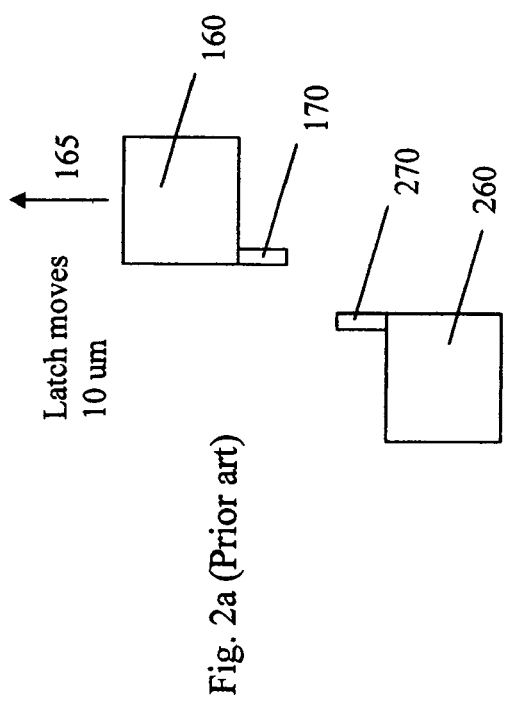
FIGS. 2a-2d are diagrams illustrating the sequence of movements required to close the switch illustrated in FIG. 1.
Figure 2B:
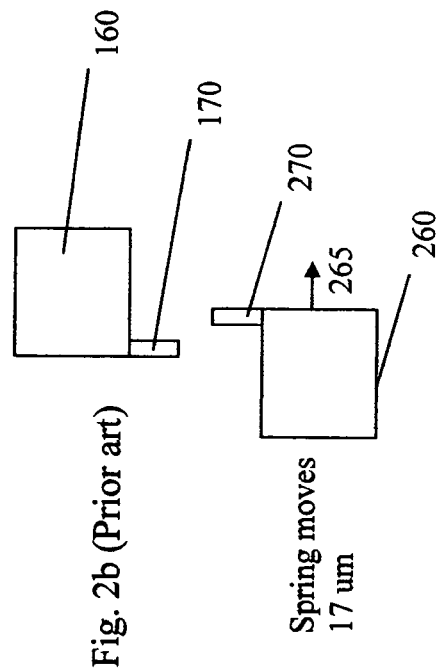
Figure 2C:
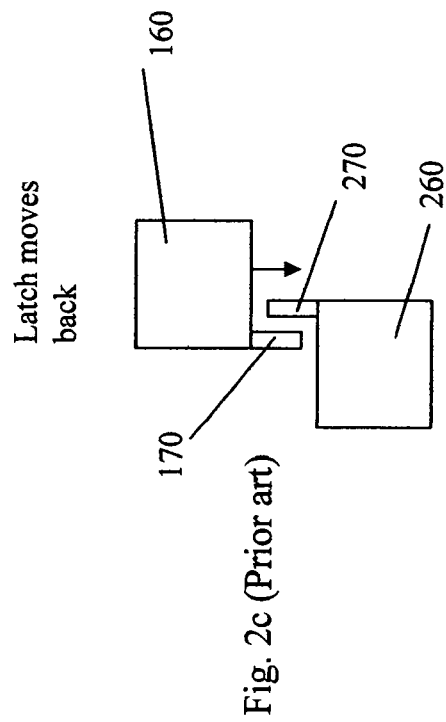
Figure 2D:
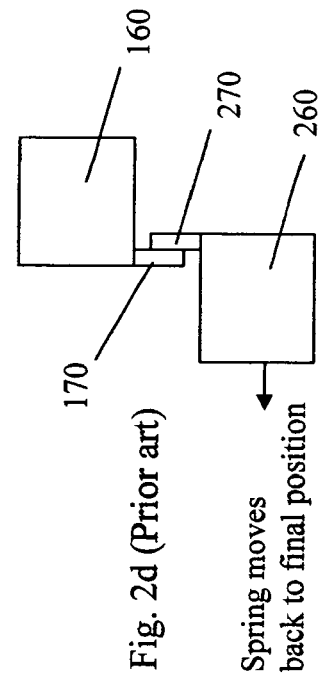

Because of the location of contacts 470 and 480 may be adjacent to one another, contact 470 does not need to be retracted as was shown in FIG. 2a. Instead, the sequence of motion for the MEMS hysteretic thermal actuator 500 is shown as shown in FIG. 4, wherein upon energizing the drive beam, the tip of the cool beam moves up and to the left. Upon cessation of the drive current pulse, the cool beam relaxes on the upper trajectory shown in FIG. 4, whereupon it becomes engaged on contact 480, because it relaxes more quickly in the x-direction than the y-direction. The spring constant of the MEMS hysteretic thermal actuator 500 causes the switch to remain latched, because it exerts a normal force on the contact surfaces 470 and 480. The contact surfaces 470 and 480 remain engaged because of friction between the contact surfaces 470 and 480. Alternatively, the contact surfaces 470 and 480 may be shaped so that they remain engaged even without friction. Techniques and design considerations for such a switch are described in U.S. patent application Ser. No. 11/263,912, which is incorporated by reference in its entirety for all purposes.

To unlatch the MEMS hysteretic actuator 500, a square wave current pulse may again be applied to the drive beams 320 and 420. The unlatching current pulse may be of a lower amplitude and/or shorter duration than the latching current pulse. The resulting movement of the MEMS hysteretic thermal actuator releases the MEMS hysteretic thermal actuator from its engagement with contact 480. The restoring force of beam portion 400 may be designed to provide sufficient retraction of beam portion 400 to clear the engaging contact 480. The unlatch pulse may also be tailored in pulse shape, magnitude and duration to assure that MEMS hysteretic actuator 500 is released from the latched position.

Figure 5:
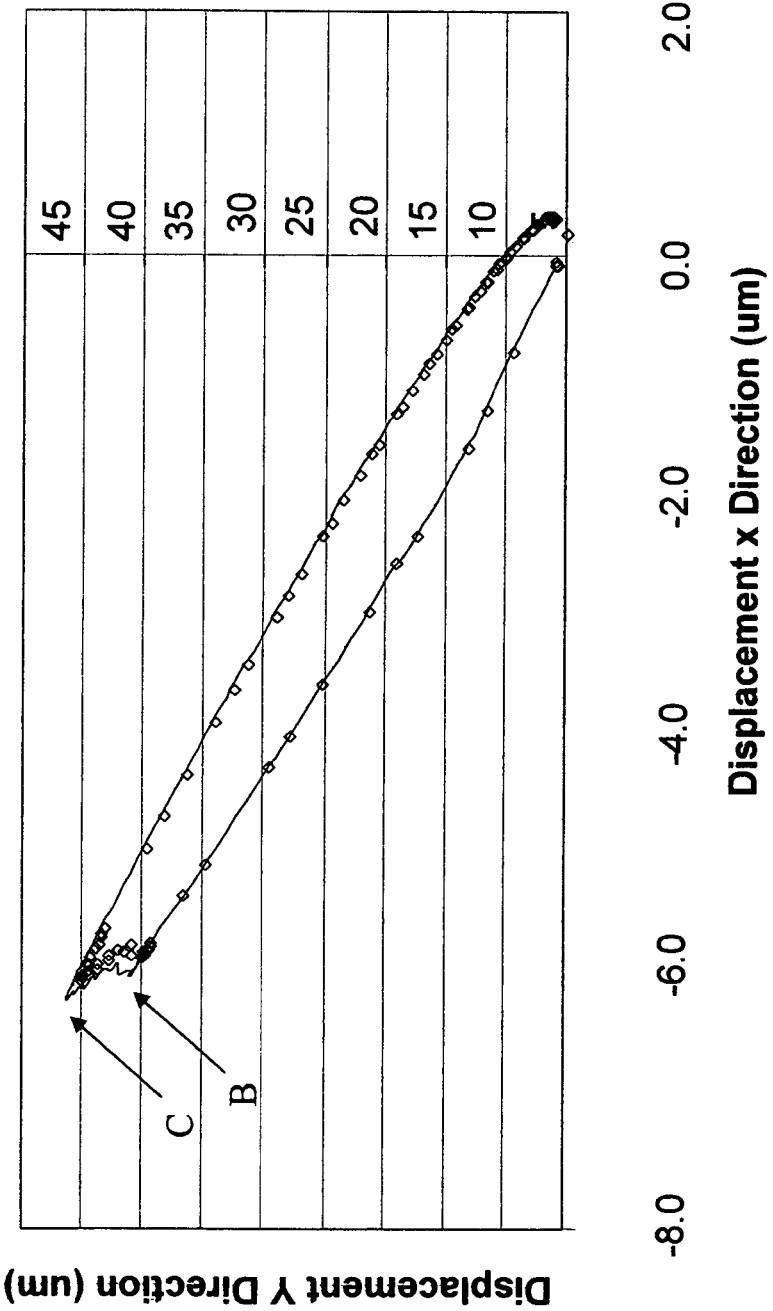
FIG. 5 is a plot of the results of a simulation predicting the behavior of the MEMS hysteretic thermal actuator of FIG. 3 in response to the application of a first square wave current pulse followed by another short current pulse.

The hysteresis shown in FIG. 4 may also be enhanced, if needed, by tailoring the shape of the current pulse applied to drive beams 320 and 420. For example, if the first 3 μsec, 190 mA current pulse is followed immediately by a second, lower current pulse of 160 mA for another 3 μsec, the trajectory of the tip of the MEMS hysteretic actuator 500 is as shown in FIG. 5. In FIG. 5, the second current pulse is applied at the point labeled B in the graph. The current ceases at the point labeled C in the graph, and the upper trajectory describes the relaxation of the MEMS hysteretic actuator 500. The result of the second current pulse is to hold the MEMS hysteretic thermal actuator 500 in approximately its deformed shape, while the additional heat provided by the additional current moves the point of maximum temperature from a location about ⅔ down the length of the MEMS hysteretic thermal actuator 500 to the tip end of the MEMS hysteretic thermal actuator 500. As a result, the hysteresis experienced by the cooling MEMS hysteretic thermal actuator 500 may be exaggerated, because the heat built up in the tip end of the MEMS hysteretic thermal actuator 500 takes longer to dissipate through the far-removed contacts 330 and 340.

Although FIG. 5 shows results for one particular example of a tailored pulse shape, it should be clear that a large number of alternative pulse shapes or pulse trains can be envisioned, such as a triangular, ramped or saw-toothed pulse shape, to accomplish other objectives with the MEMS hysteretic actuator 500, or enhance its performance in other ways.

Additional features of the MEMS hysteretic actuator 500 may be used to adjust the deflection of the MEMS hysteretic actuator 500. For example, areas in the cool beams 310 and 410 may be removed to form a flexible hinge, to enhance the deflection of the cool beams 310 and 410 about their respective anchor points. Design considerations and implementation of such features are described further in the incorporated '912 application.

Figure 6:
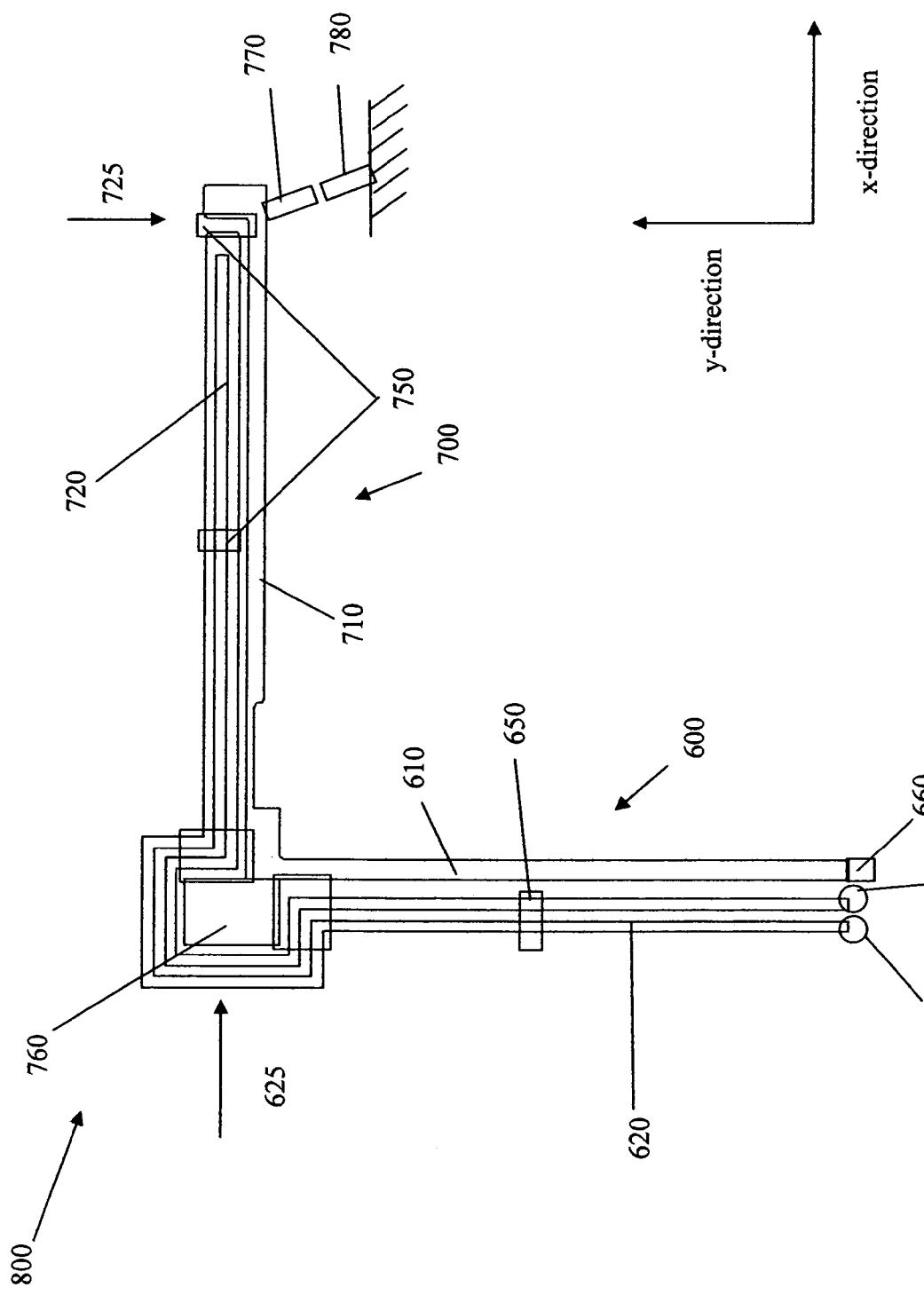
FIG. 6 is a diagram illustrating a second exemplary embodiment of a MEMS hysteretic thermal actuator.

FIG. 6 is a diagram illustrating a second exemplary embodiment of the MEMS hysteretic thermal actuator 800. In the second exemplary embodiment, as in the first exemplary embodiment, the MEMS hysteretic thermal actuator 800 includes two beam portions 600 and 700 coupled by a substantially ninety-degree joint 760. Beam portions 600 and 700 are coupled to pivot anchor 660 and joint 760, respectively. Each beam portion 600 and 700 includes a drive beam portion 620 and 720 and a cool beam portion 610 and 710. However, in the second exemplary embodiment, the drive beam portions 620 and 720 are disposed on the opposite side of cool beam portions 610 and 710, compared to the first exemplary embodiment. For this reason, MEMS hysteretic thermal actuator 800 bends in an opposite sense to MEMS hysteretic thermal actuator 500, as drive beam portion 620 tends to bend cool beam portion 610 in the positive x-direction 625 rather than the negative x-direction. Similarly, drive beam portion 720 tends to bend cool beam portion 710 in the negative y-direction 725 rather than the positive y-direction. Upon cooling, because of its proximity to the heat sink of contacts 630 and 640, the drive beam 620 cools more rapidly than drive beam 720, resulting in hysteretic behavior of the MEMS hysteretic actuator 800. Therefore, the behavior of this MEMS hysteretic actuator 800, if plotted on a graph similar to FIGS. 4 and 5, would show the inverse behavior. The tip end of the MEMS hysteretic thermal actuator would therefore be driven to the lower right of FIG. 6. Accordingly, to make an electrical switch using MEMS hysteretic thermal actuator 800, the contacts 770 and 780 would be placed as shown in FIG. 6.

Figure 7:
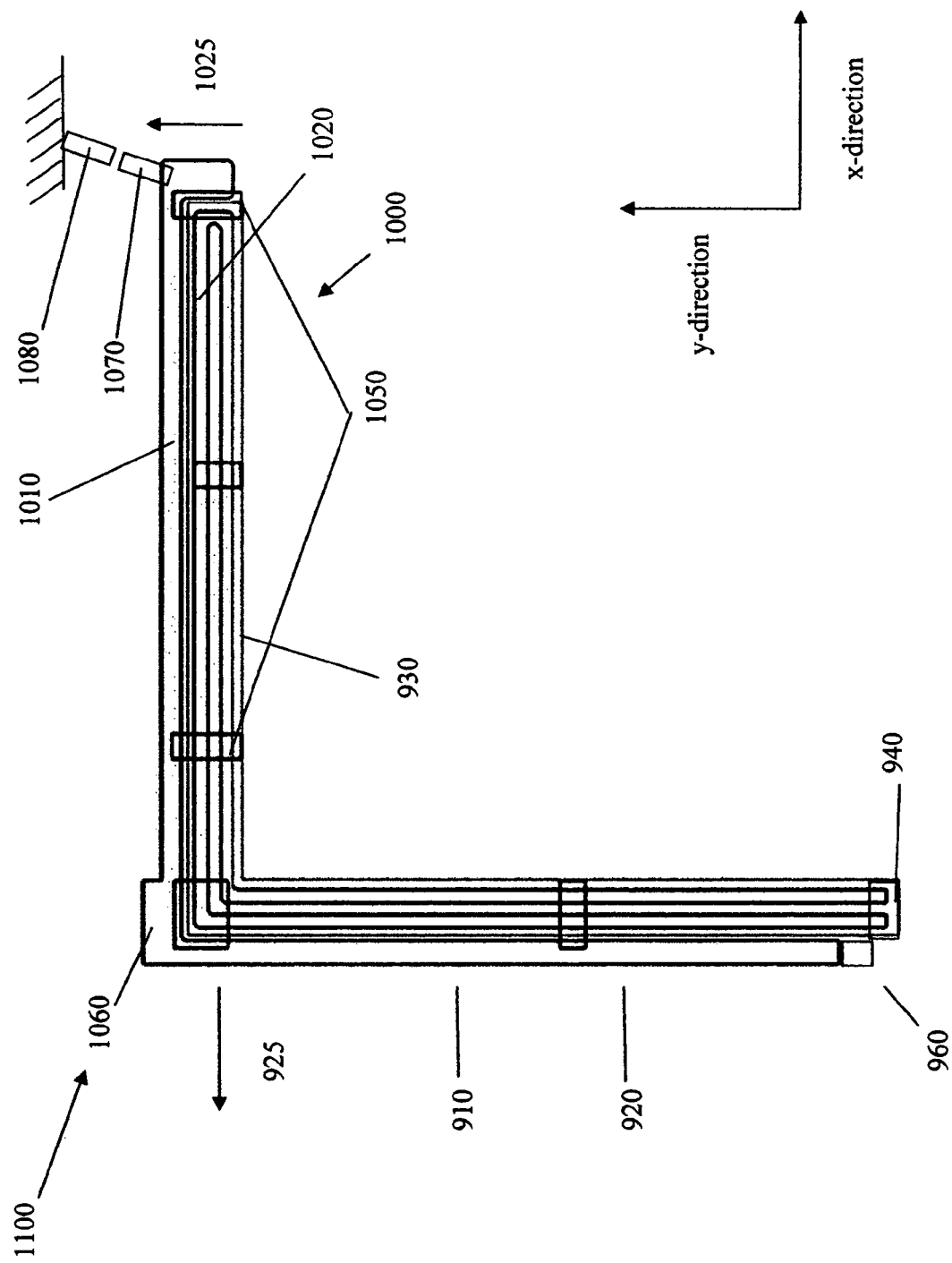
FIG. 7 is a diagram illustrating a third exemplary embodiment of a MEMS hysteretic thermal actuator, in which a heater element is disposed adjacent to the drive beams.

FIG. 7 is a diagram illustrating a third exemplary embodiment of the MEMS hysteretic actuator 1100. As with the previous embodiments, the MEMS hysteretic thermal actuator 1100 includes two beam portions 900 and 1000 coupled by a substantially ninety-degree joint 1060. Each beam portion 900 and 1000 includes a drive beam portion 920 and 1020 and a cool beam portion 910 and 1010. Drive beam portions 920 and 1020 may be coupled to cool beam portions 910 and 1010 by tethers 950 and 1050, respectively. Tethers 950 and 1050 may be thermally insulating, though not necessarily electrically insulating.

In the second exemplary embodiment, the drive beam portions 920 and 1020 are disposed adjacent to a heater element 930, which supplies heat to the drive beam portions 920 and 1020. The heater element also has a heat sink 940 disposed at its base, which dissipates heat when the heater element 930 is disabled. The heater element 930 may include, for example, an electrical circuit arranged in a serpentine pattern within heater element 930. For simplicity of depiction, however, the electrical circuit is not shown in FIG. 7, and the heater element 930 is shown as a simple outline overlaying drive beam portions 920 and 1020. It should be understood, however, that the heater element 930 may generate heat in any of a number of other ways, for example, it may be an optically opaque element which absorbs incident light.

Upon becoming heated by the heater element 930, drive beam portions 920 and 1020 expand, driving cool beam portions 910 and 1010 in directions 925 and 1025, respectively. Upon cooling, because of its proximity to the heat sink 940 of heater element 930, the drive beam 920 cools more rapidly than drive beam 1020, resulting in hysteretic behavior of the MEMS hysteretic actuator 1100. Accordingly, the behavior of MEMS hysteretic thermal actuator 1100 is similar to that of MEMS hysteretic thermal actuator 500, and can be described qualitatively by the plots shown in FIGS. 4 and 5. A latching electrical switch may be made using MEMS hysteretic actuator 1100, by disposing contacts 1070 and 1080 as shown in FIG. 7.

Figure 8:
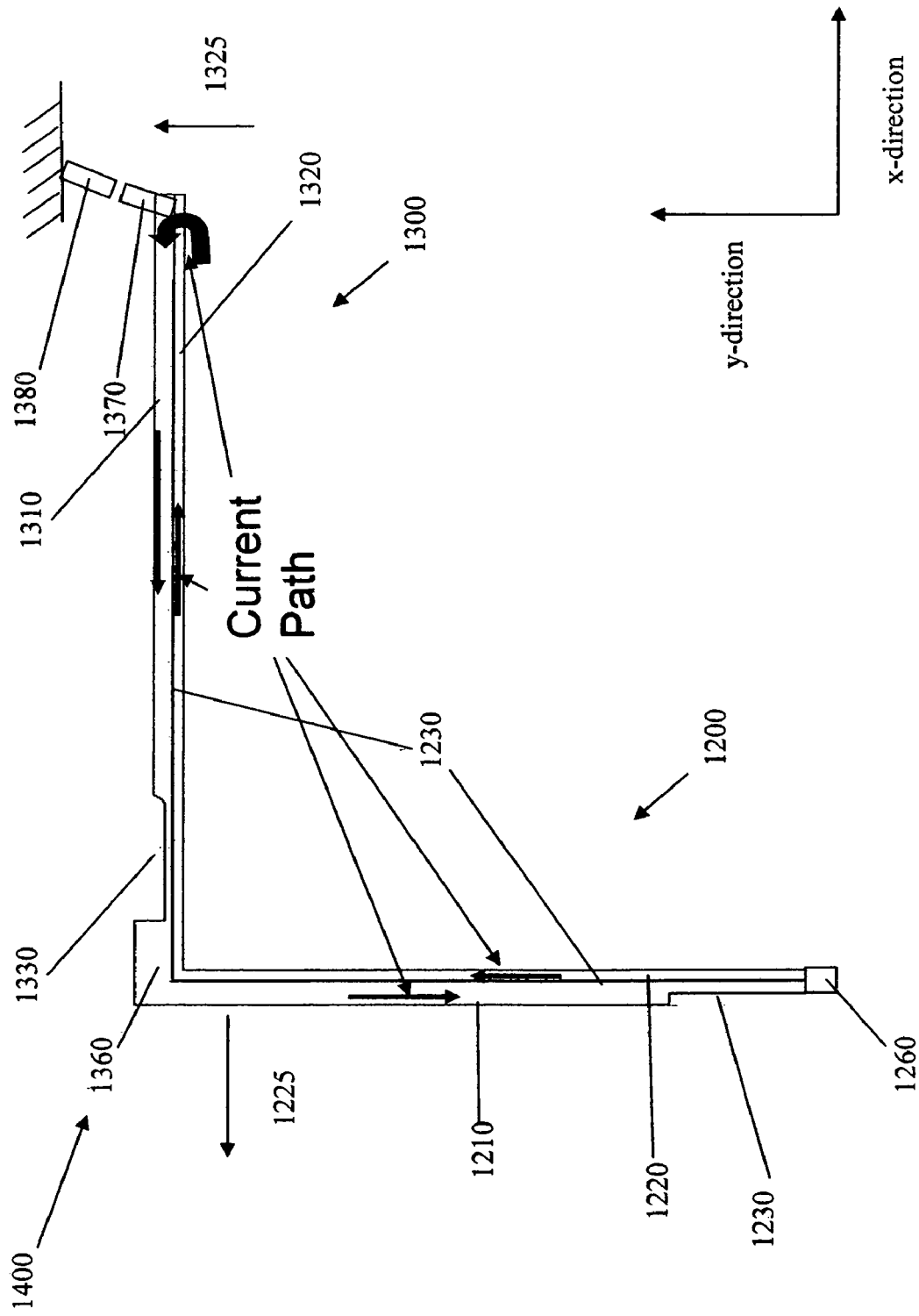
FIG. 8 is a diagram illustrating a fourth exemplary embodiment of a MEMS hysteretic thermal actuator, in which current flows through and heats a high coefficient of thermal expansion material along with a low coefficient of thermal expansion material.

FIG. 8 is a diagram illustrating a fourth exemplary embodiment of MEMS hysteretic actuator 1400. As with the previous embodiments, the MEMS hysteretic thermal actuator 1400 includes two beam portions 1200 and 1300 coupled by a substantially ninety-degree joint 1360. Each beam portion 1200 and 1300 includes a drive beam portion 1220 and 1320 and a driven beam portion 1210 and 1310. The drive beam portions 1220 and 1320 are separated from the driven beam portions 1210 and 1310 by a dielectric barrier 1230 which extends out toward the end region of the second beam portion 1300, but ends before the edge of second beam portion 1300. The flexibility of the two segments 1200 and 1300 to bending about the anchor point 1260 and rigid link 1360, respectively, may be adjusted by removing an area of material 1230 and 1330, near their pivot points, which causes segments 1200 and 1300 to pivot more easily about these points.

The drive beam portions 1220 and 1320 may be formed of a material having a higher coefficient of thermal expansion (CTE), relative to driven beam portions 1210 and 1310, which are formed of a material having a lower coefficient of thermal expansion. However, all of beam portions 1220, 1320, 1210 and 1310 are electrically conductive. A current is driven through drive beam portions 1220 and 1320 to the end of the second beam portion 1300, whereupon the current reverses direction and flows out through driven beam portion 1310 and 1210. The current causes joule heating in both beam portions 1200 and 1300. However, because drive beam portions 1220 and 1320 are formed from a material having a higher coefficient of thermal expansion relative to driven beam portions 1210 and 1310, drive beam portions expand relative to driven beam portions 1210 and 1310. Accordingly, drive beam portions 1220 and 1320 bend the driven beam portions 1210 and 1310 about anchor point 1260 and substantially ninety-degree joint 1360, respectively. Upon cooling, because of its proximity to the heat sink of anchor point 1260, the drive beam 1220 cools more rapidly than drive beam 1320, resulting in hysteretic behavior of the MEMS hysteretic actuator 1400. Accordingly, the behavior of MEMS hysteretic thermal actuator 1400 is similar to that of MEMS hysteretic thermal actuator 500, and can be described by plots similar to those shown in FIGS. 4 and 5. A latching electrical switch may be made using MEMS hysteretic actuator 1400, by disposing contacts 1370 and 1380 as shown in FIG. 8.

Figure 9:
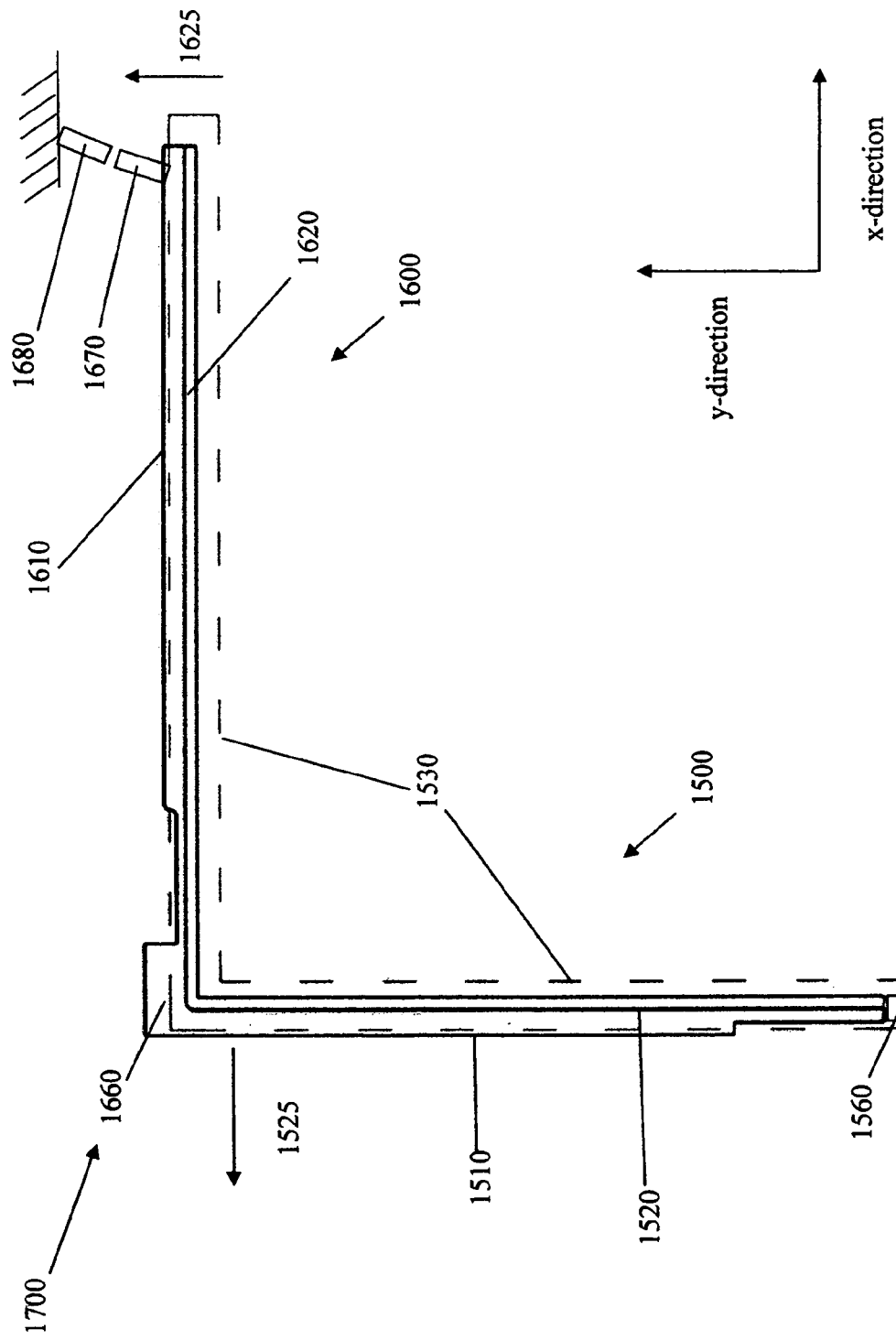
FIG. 9 is a diagram illustrating a fifth exemplary embodiment of a MEMS hysteretic thermal actuator, in which a heater is disposed adjacent to a low coefficient of thermal expansion member and a high coefficient of thermal expansion member.

FIG. 9 is a diagram illustrating a fifth exemplary embodiment of MEMS hysteretic thermal actuator 1700. As with the previous embodiments, the MEMS hysteretic thermal actuator 1700 includes two beam portions 1500 and 1600 coupled by a substantially ninety-degree joint 1660. Each beam portion 1500 and 1600 includes a drive beam portion 1520 and 1620 and a driven beam portion 1510 and 1610. The fifth exemplary embodiment is also similar to the fourth exemplary embodiment, in that the drive beam portions 1520 and 1620 are formed from a material having a higher coefficient of thermal expansion, and the driven beam portions 1510 and 1610 are formed from a material having a lower coefficient of thermal expansion. However, in the fifth exemplary embodiment, beam portions 1510, 1520, 1610 and 1620 need not be electrically conductive, because heat is supplied by a heater element 1530. Heater element 1530 may be a conductive circuit with wires formed in a serpentine pattern, or may be any other device capable of generating heat. The heat generated by heater element 1530 is absorbed by drive beam portions 1520 and 1620, as well as driven beam portions 1520 and 1610. However, because drive beam portions 1520 and 1620 are formed from a material having a higher coefficient of thermal expansion relative to driven beam portions 1510 and 1610, drive beam portions expand relative to driven beam portions 1510 and 1610. Accordingly, drive beam portions 1520 and 1620 bend the driven beam portions 1510 and 1610 about anchor point 1560 and substantially ninety-degree joint 1660, respectively. Upon cooling, because of its proximity to the heat sink of the anchor point 1560, the drive beam 1520 cools more rapidly than drive beam 1620, resulting in hysteretic behavior of the MEMS hysteretic actuator 1700. Accordingly, the behavior of MEMS hysteretic thermal actuator 1700 is similar to that of MEMS hysteretic thermal actuator 500, and can be described by plots similar to those shown in FIGS. 4 and 5. A latching electrical switch may be made using MEMS hysteretic actuator 1700, by disposing contacts 1670 and 1680 as shown in FIG. 9.

Figure 10:
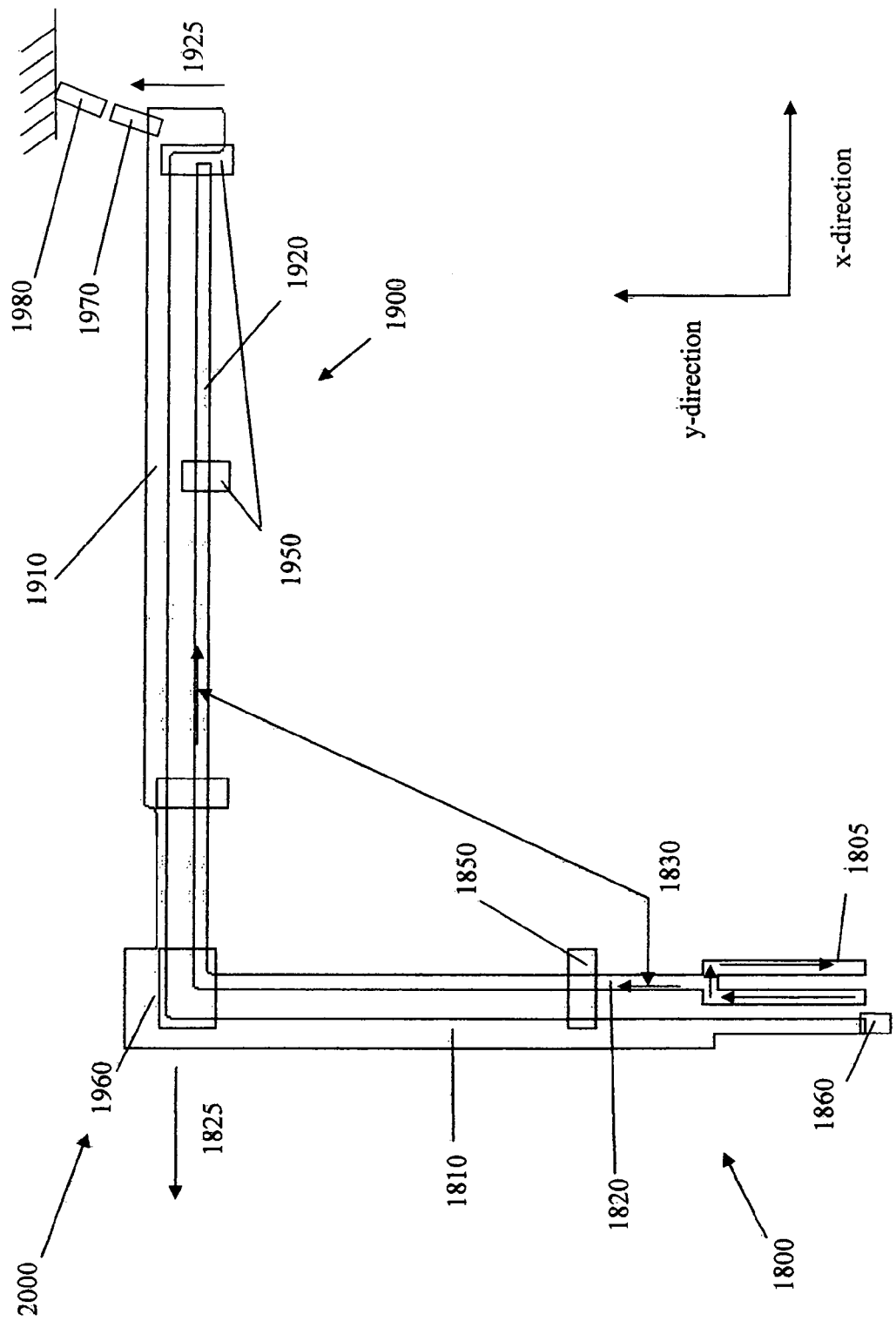
FIG. 10 is a diagram illustrating a sixth exemplary embodiment of a MEMS hysteretic thermal actuator, in which a heat source is disposed at the base of a heat conductor which conducts the heat to the tip of the thermal actuator.

FIG. 10 is a diagram illustrating a sixth exemplary embodiment of the MEMS hysteretic thermal actuator 2000. Like the previous embodiments, MEMS hysteretic thermal actuator 2000 includes two beam portions 1800 and 1900 coupled by a substantially ninety-degree joint 1960. Each beam portion 1800 and 1900 includes a drive beam portion 1820 and 1920 and a driven beam portion 1810 and 1910, which are coupled by tethers 1850 and 1950, respectively. The drive beam portions 1820 and 1920 are formed from stiff, thermally conductive materials. Drive beam portion 1820 is in thermal communication with a circuit 1805, which generates heat at the base of the drive beam portion 1820. The heat generated by circuit 1805 is conducted by thermally conductive drive beam portion 1820 to thermally conductive drive beam portion 1920, causing drive beam portions 1820 and 1920 to heat up. Accordingly, the drive beam portions 1820 and 1920 are required to be thermally conductive, but may not be electrically conductive.

The heating of drive beam members 1820 and 1920 causes drive beam members 1820 and 1920 to expand. The expansion of drive beam member 1820 causes driven beam 1810 to bend about anchor point 1860 in the negative x-direction 1825. Similarly, the expansion of drive beam member 1920 causes driven beam member 1910 to bend about substantially ninety-degree joint 1960 in the positive y-direction 1925. Upon cooling, because of its proximity to the heat sink of electrical circuit 1805, the drive beam 1820 cools more rapidly than drive beam 1920, resulting in hysteretic behavior of the MEMS hysteretic actuator 2000. Accordingly, the behavior of MEMS hysteretic thermal actuator 2000 may be similar to that of MEMS hysteretic thermal actuator 500, and may be described by plots similar to those shown in FIGS. 4 and 5. A latching electrical switch may be made using MEMS hysteretic actuator 2000, by disposing contacts 1970 and 1980 as shown in FIG. 10.

Figure 11:
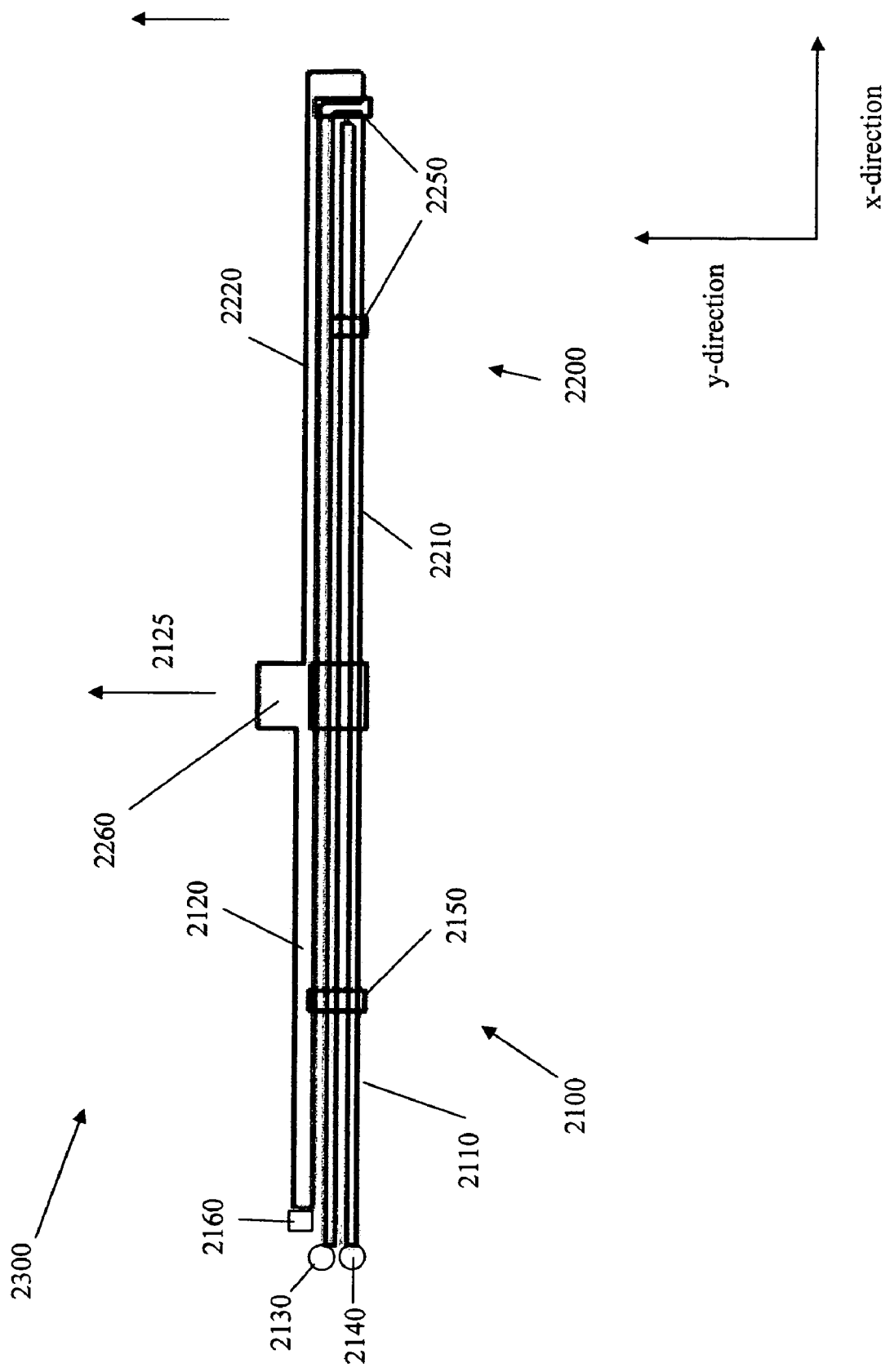
FIG. 11 is a diagram illustrating a seventh exemplary embodiment of a MEMS hysteretic thermal actuator, in which a first segment is coupled to a second segment by a rectilinear rigid link.

FIG. 11 is a diagram of a seventh exemplary embodiment of a MEMS hysteretic thermal actuator 2300. Like the previous embodiments, MEMS hysteretic thermal actuator 2300 includes two beam portions 2100 and 2200 coupled by a rigid link 2260. However, in this embodiment, the rigid link 2260 does not join the two beam portions 2100 and 2200 at a substantially ninety-degree angle. Instead, rigid link 2260 joins beam portion 2100 and 2100 in a rectilinear fashion. Rigid link 2260 provides a distinct pivot point for beam portion 2200 compared to beam portion 2100, which may pivot about anchor point 2160. Accordingly, the presence of rigid link 2260 allows MEMS hysteretic actuator 2300 to move in two substantially different directions, with at least about a five degree angle between these directions. Each beam portion 2100 and 2200 includes a drive beam portion 2120 and 2220 and a driven beam portion 2110 and 2210, which are coupled by tethers 2150 and 2250, respectively.

Heat is generated in drive beam portions 2120 and 2220 by applying a voltage between contacts 2130 and 2140. Current flows in drive beam portions 2120 and 2220 as a result of the voltage, which heats drive beam portions 2120 and 2220 by joule heating. Drive beam portions 2120 and 2220 expand because of their increased temperature. Because drive beam portions 2120 and 2220 are tethered to driven beam portions 2110 and 2210 by tethers 2150 and 2250, the expansion causes driven beam member 2110 to bend about anchor point 2160, and driven beam member 2210 to bend about rigid link 2260. Upon cooling, the drive beam portion 2120 cools faster than drive beam portion 2220, because of its closer proximity to the heat sink of contacts 2130 and 2140. As a result, the motion of MEMS hysteretic thermal actuator 2300 is hysteretic, as the thermal profile of the MEMS hysteretic thermal actuator 2300 is different upon heating than it is upon cooling. By disposing contacts in the appropriate locations on MEMS hysteretic thermal actuator 2300, a latching electrical switch may be formed.

Although embodiments have been described wherein the first segment is joined to the second segment at an angle of about zero degrees (FIG. 11) and an angle of about ninety degrees (FIGS. 3 and 6-10), it should be understood that any other angle greater than or equal to about zero degrees and less than or equal to about ninety degrees may also be used in the MEMS hysteretic actuator.

Figure 12:
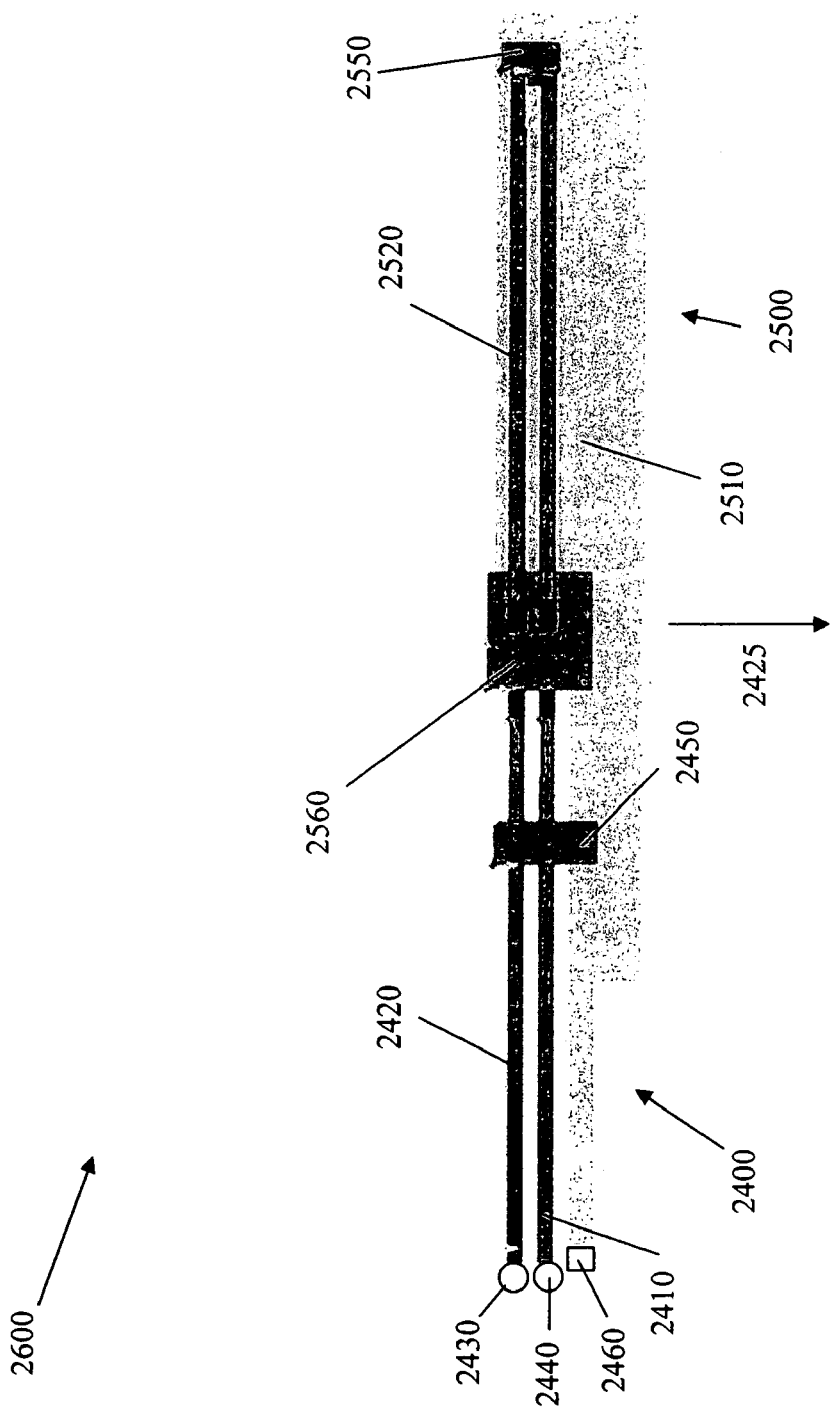
FIG. 12 is a side view of an eighth exemplary MEMS hysteretic thermal actuator, wherein the motion of a first segment is in one plane, and the motion of a second segment is in another, substantially orthogonal plane.
Figure 13:
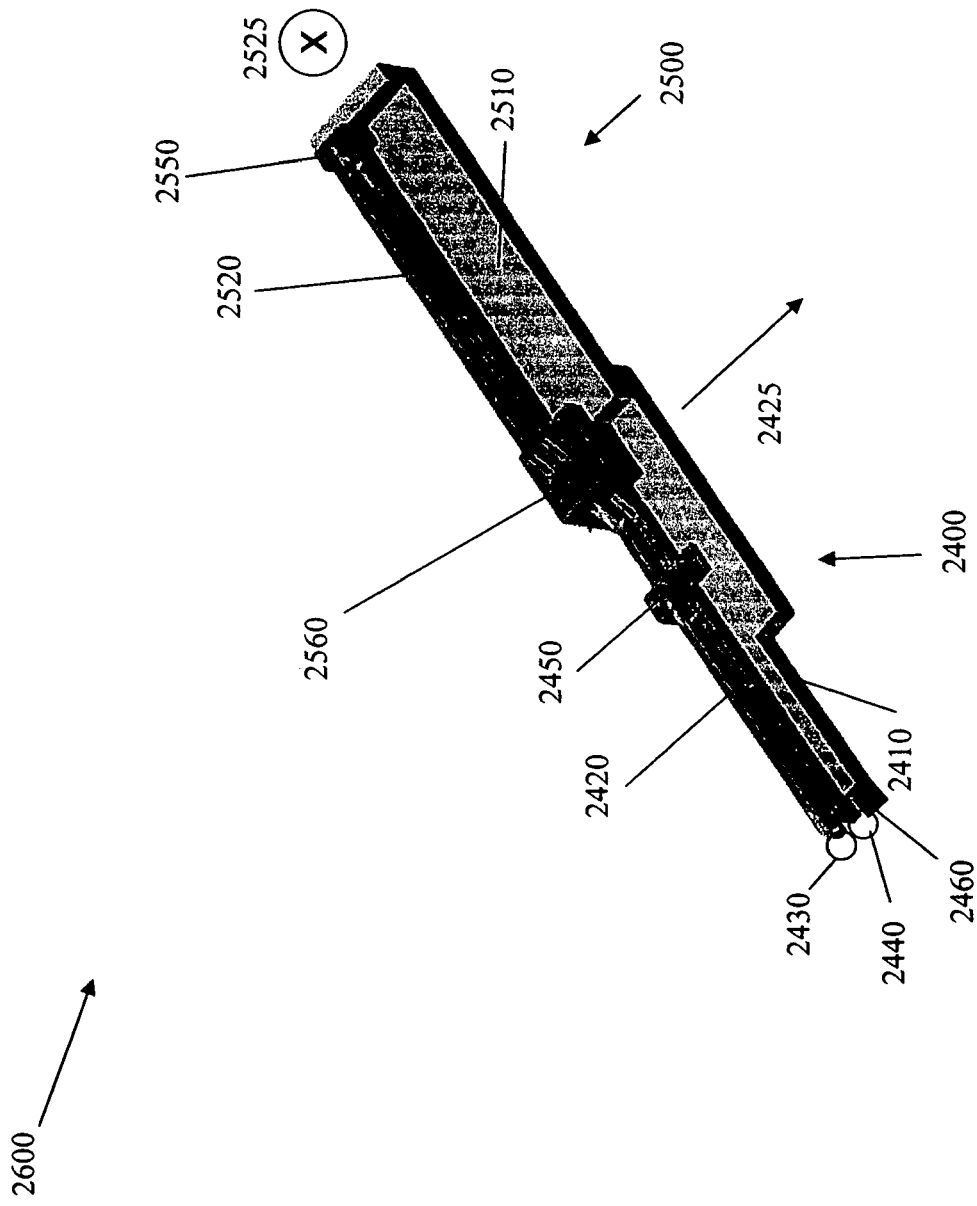
FIG. 13 is a perspective rendering of the MEMS hysteretic thermal actuator of FIG. 12.

FIG. 12 is a schematic side view of an eighth exemplary embodiment of a MEMS hysteretic thermal actuator 2600. Like the previous embodiments, MEMS hysteretic thermal actuator 2600 includes two beam portions 2400 and 2500 coupled by a rigid link 2560. Each beam portion 2400 and 2500 includes a drive beam portion 2420 and 2520 and a driven beam portion 2410 and 2510, which are coupled by tethers 2450 and 2550, respectively. However, in this embodiment, drive beam portions 2420 and 2520 are disposed such that they drive the driven beam portions 2410 and 2510 in two different planes. In particular, drive beam portion 2420 is oriented to bend driven beam portion 2410 about fixed anchor point 2460 in direction 2425, indicated in FIG. 12. Drive beam portion 2520 is oriented to bend driven beam portion 2510 about the rigid link 2560 in the direction 2525, which is into the paper as indicated in FIG. 12. Accordingly, MEMS hysteretic thermal actuator has one component bending in the plane of the paper, and another component bending in a plane orthogonal to the paper. Like the previous embodiments, current is input to drive beam portions 2420 and 2520 by applying a voltage between contacts 2430 and 2440. The current heats the drive beams by joule heating, and the resulting expansion of the drive beam portions 2420 and 2520 causes the bending of the driven beams 2410 and 2510 described above. The contacts 2430 and 2440 also provide a heat sink for the drive beam portions 2420 and 2520. Accordingly, drive beam portion 2420 located nearer to heat sink contacts 2430 and 2440 cools more quickly than drive beam portion 2520 located farther from heat sink contacts 2430 and 2440. Therefore, the motion of MEMS hysteretic thermal actuator 2600, like MEMS hysteretic thermal actuators 500-2300 is hysteretic between the heating phase and the cooling phase.

Although the embodiments described above each have at least two straight beam segments in the cantilever, it should be understood that a MEMS hysteretic device may also be formed using a single cantilevered arcuate beam. In this embodiment, the arcuate actuator is disposed adjacent to an arcuate drive beam, and tethered to the drive beam by at least two dielectric tethers, one at the tip of the arcuate actuator and one at an intermediate location. The amount of hysteresis provided by such an arcuate embodiment may depend on the curvature of the cantilever and the location of the dielectric tethers. However, in general, the cantilever having two segments disposed orthogonally to each other may have a larger amount of hysteresis, and may therefore be more suitable for making a latching switch.

An exemplary method for fabricating the MEMS hysteretic actuator will be described next. Although the method is directed primarily to the fabrication of MEMS hysteretic actuator 500, it should be understood that the method may also be used to fabricate MEMS hysteretic actuators 800-2600, as well as MEMS hysteretic thermal actuator 500. The MEMS hysteretic actuator may be fabricated on any convenient substrate 3620, for example silicon, silicon-on-insulator (SOI), glass, or the like. Because in FIGS. 14-18, the MEMS hysteretic actuator is shown in cross section, only one of the two segments of the MEMS hysteretic thermal actuator can be seen in the figures, as the other may be oriented substantially ninety-degrees from the depicted segment. For example, in FIG. 18, element 3400 should be understood to depict second beam segment 400 in MEMS hysteretic actuator 500, for example. However, it should be understood that the first segment 300 may be formed at the same time as, and using identical processes to those used to form the second segment 3400 which is depicted in FIGS. 14-18. Similarly, although only one segment 3400 of the MEMS actuator beam is shown in FIGS. 14-18, it should be understood that both the cool beam portion 410 and drive beam portion 420 of second beam segment 400 may be formed at the same time, using the same process steps and materials, as used to form segment 3400.

Figure 14:
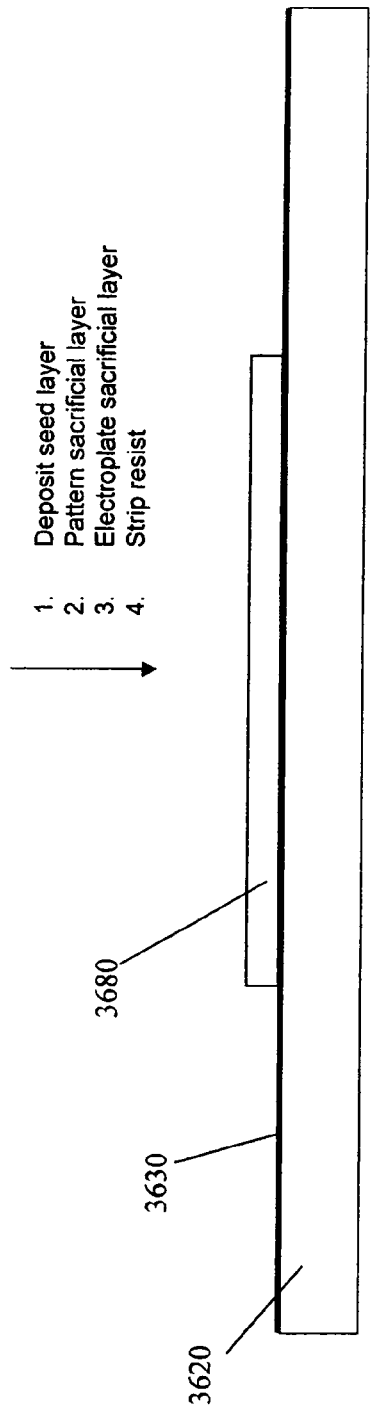
FIG. 14 illustrates a first step in the fabrication of the MEMS hysteretic actuator.

FIG. 14 illustrates a first exemplary step in the fabrication of the MEMS hysteretic thermal actuator. The process begins with the deposition of a seed layer 3630 for later plating of the MEMS actuator beam 3400, over the substrate 3620. The seed layer 3630 may be chromium (Cr) and gold (Au), deposited by plasma vapor deposition (PVD) to a thickness of 100-200 nm. Photoresist may then be deposited over the seed layer 3630, and patterned by exposure through a mask. A sacrificial layer 3680, such as copper, of a thickness of 3 um may then be electroplated over the seed layer. The plating solution may be any standard commercially available or in-house formulated copper plating bath. Plating conditions are particular to the manufacturer's guidelines. However, any other sacrificial material that can be electroplated may also be used. In addition, deposition processes other than plating may be used to form sacrificial layer 3680. The photoresist may then be stripped from the substrate 3620.

Figure 15:
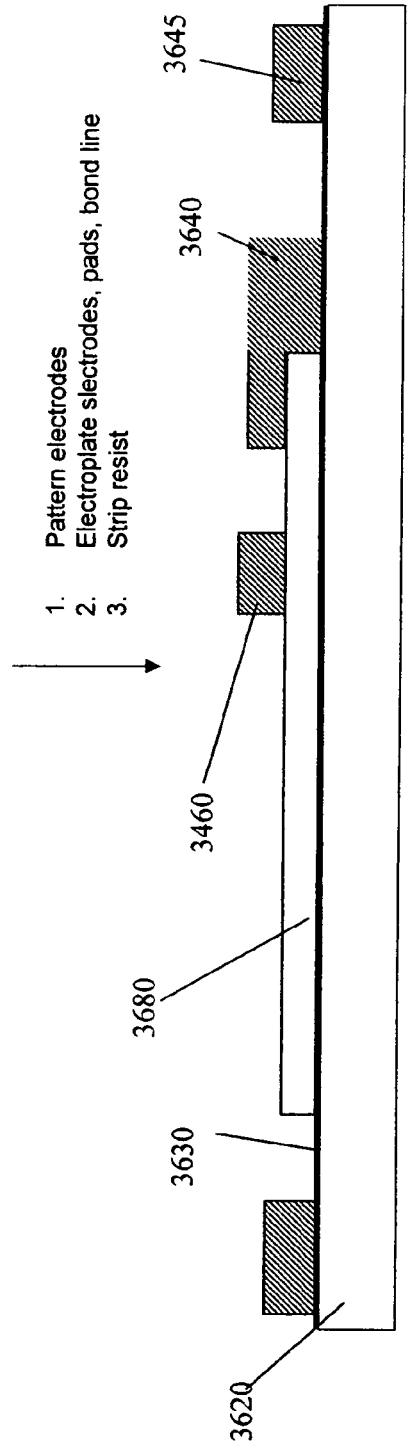
FIG. 15 illustrates a second step in the fabrication of the MEMS hysteretic actuator.

A second exemplary step in fabricating the MEMS hysteretic actuator is illustrated in FIG. 15. In FIG. 15, the substrate 3620 is again covered with photoresist, which is exposed through a mask with features corresponding to gold pads 3640 and 3645 and a gold tip member 3460. Gold may be used for the tip member 3460 because it may have lower contact resistance than the material that will form the beam 3400. Gold tip member 3460 may correspond to any of electrical contacts 470, 770, 1070, 1370, 1670, or 1970. Although not shown in this view, it should be understood that the features for the other contacts such as contacts 330 and 340 may also be formed in this step. The features 3460 and 3640 will subsequently be plated in the appropriate areas. The gold features 3640, 3645 may include a bonding ring, which will eventually form a portion of a hermetic seal which may bond a cap layer over the substrate 3620 and actuator 3400. One of the gold features 3645 may also be an external access pad that will provide access to the MEMS hysteretic actuator electrically, from outside the hermetically sealed structure.

The gold features 3640, 3645 and 3460 may then be electroplated in the areas exposed by the photoresist, to form gold features 3640, 3645 and 3460 and any other gold structures needed. The photoresist is then stripped from the substrate 3620. The thickness of the gold features 3640, 3645 and 3460 may be, for example, 5 μm.

Figure 16:
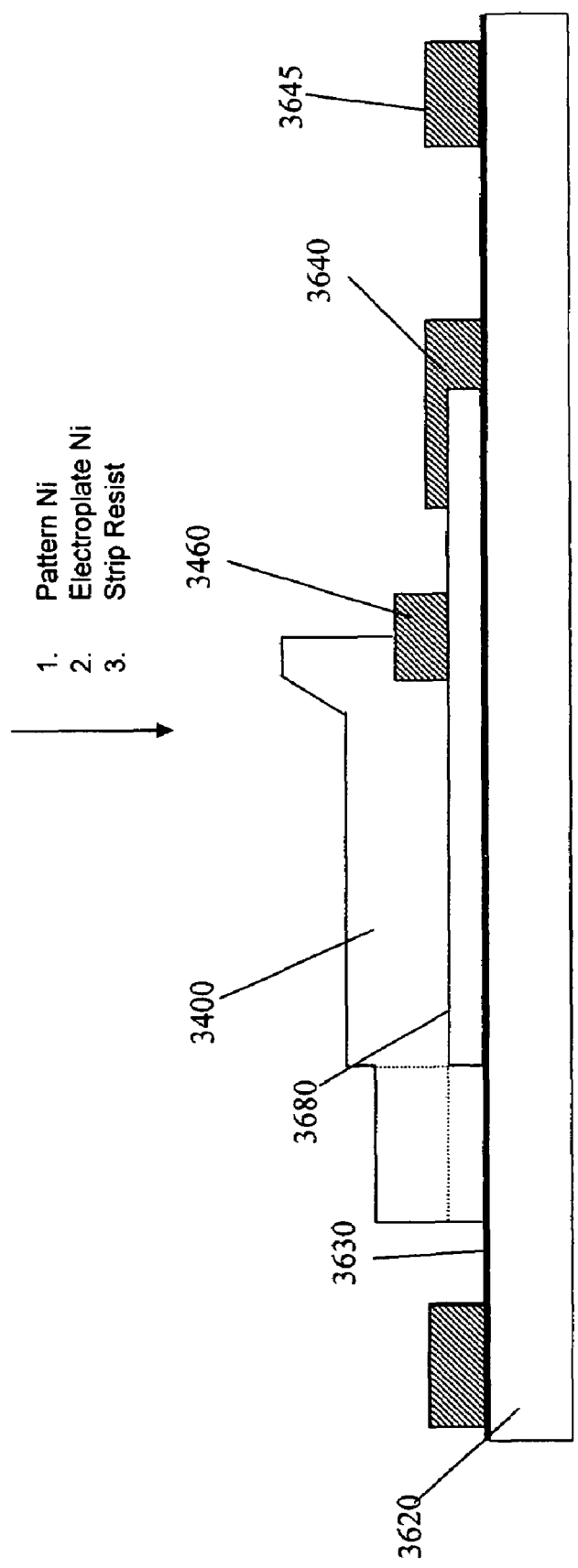
FIG. 16 illustrates a third step in the fabrication of the MEMS hysteretic actuator.

FIG. 16 illustrates a third step in fabricating the MEMS hysteretic actuator. In FIG. 16, photoresist is once again deposited over the substrate 3620, and patterned according to the features in a mask. The exposed portions of the photoresist are then dissolved as before, exposing the appropriate areas of the seed layer 3630. The exposed seed layer 3630 may then be electroplated with nickel to form the beam 3400. Although only one beam 3400 is shown in the cross section of FIG. 16, it should be understood both cool beam portion 410 and drive beam 420 of the beam segment 400 of the compact MEMS hysteretic actuator 500, for example, may be formed during this step. However, since drive beam portion 420 may be located directly adjacent to cool beam portion 410, only the single beam 3400 can be seen in FIG. 16. The tip member 3460 may be affixed to the beam 3400 by the natural adhesion of the gold to the nickel, after deposition. Although nickel is chosen in this example, it should be understood that any other conductive material that can be electroplated may also be used. In addition, deposition processes other than plating may be used to form beam 3400. The photoresist may then be stripped from the substrate 3620.

Figure 17:
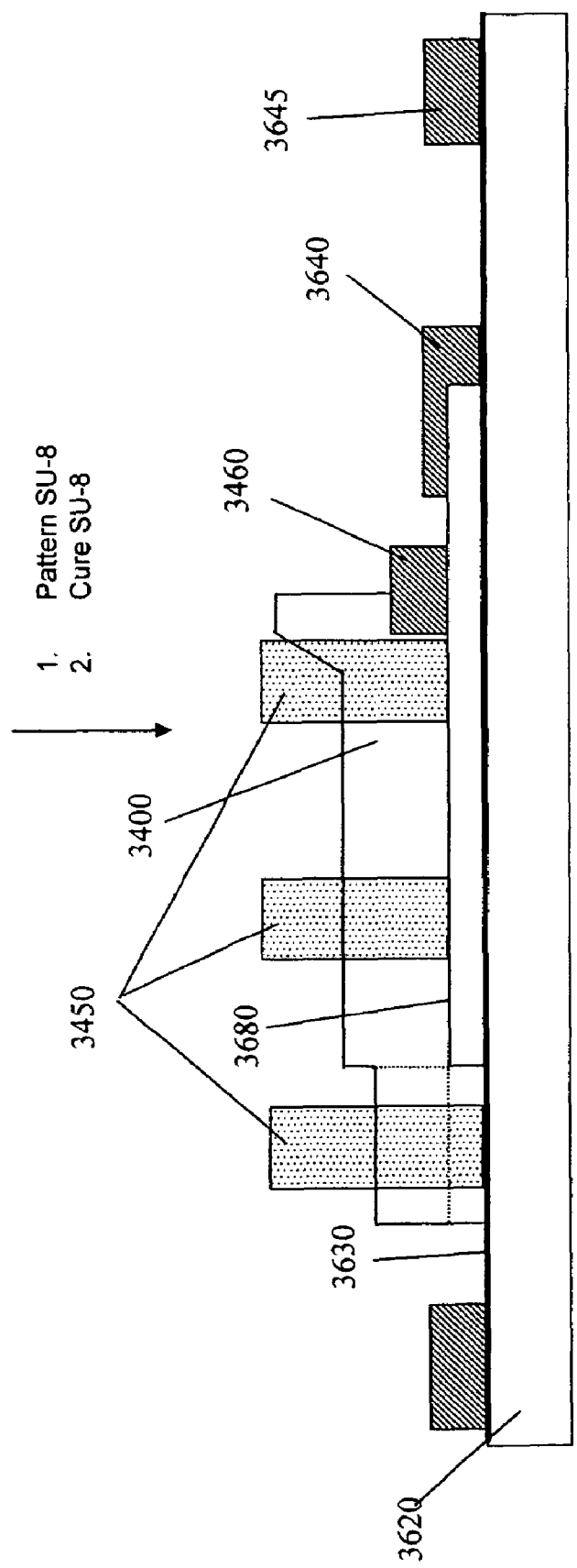
FIG. 17 illustrates a fourth step in the fabrication of the MEMS hysteretic actuator.

FIG. 17 illustrates a fourth step in the fabrication of the MEMS hysteretic actuator. In FIG. 17, a polymeric, nonconducting material such as the photoresist SU-8 is deposited over the substrate 3620, and beam 3400. The photoresist is then cross-linked, by for example, exposure to UV light. The unexposed resist is then dissolved and removed from the substrate 3620 and structure 3400 in all areas that the dielectric tether is absent. This step may form the dielectric tether 450, that tethers drive loop 420 to cool beam portion 410, for example. The photoresist may then be cured by, for example, baking.

Figure 18:
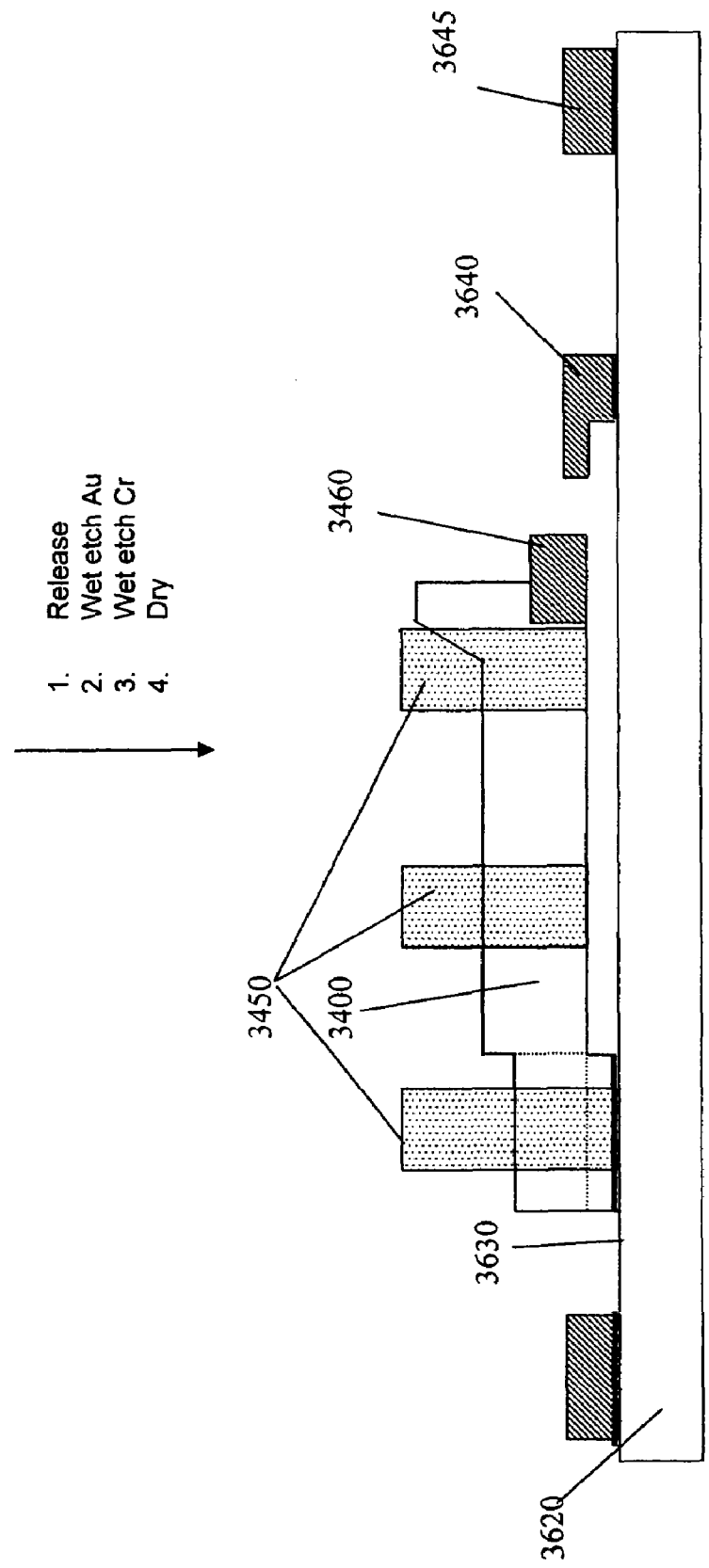
FIG. 18 illustrates a fifth step in the fabrication of the MEMS hysteretic actuator.

FIG. 18 illustrates a fifth step in the fabrication of the MEMS hysteretic actuator. In this step, the beam 3400 may be released by etching the sacrificial copper layer 3680. Suitable etchants may include, for example, an isotropic etch using an ammonia-based Cu etchant. The Cr and Au seed layer 3630 is then also etched using, for example, a wet etchant such as iodine/iodide for the Au and permanganate for the Cr, to expose the SiO$_2$ surface of the substrate 3620. The substrate 3620 with the MEMS hysteretic thermal actuator may then be rinsed and dried.

The resulting MEMS hysteretic actuator may then be encapsulated in a protective lid or cap wafer. Details relating to the fabrication of a cap layer may be found in U.S. patent application Ser. No. 11/211,625, incorporated by reference herein in its entirety.

It should be understood that one gold feature 3645 may be used as an external access pad for electrical access to the MEMS hysteretic thermal actuator, such as to supply a signal to the MEMS hysteretic thermal actuator, or to supply a voltage the terminals 330 or 340 in order to energize the drive loops of the switch, for example. The external access pad 3645 may be located outside the bond line which will be formed upon the bonding of a cap layer to the substrate 3620. Alternatively, electrical connections to MEMS hysteretic actuator may be made using through-wafer vias, such as those disclosed in U.S. patent application Ser. No. 11/211,624 , incorporated herein by reference in its entirety.

Figure 19:
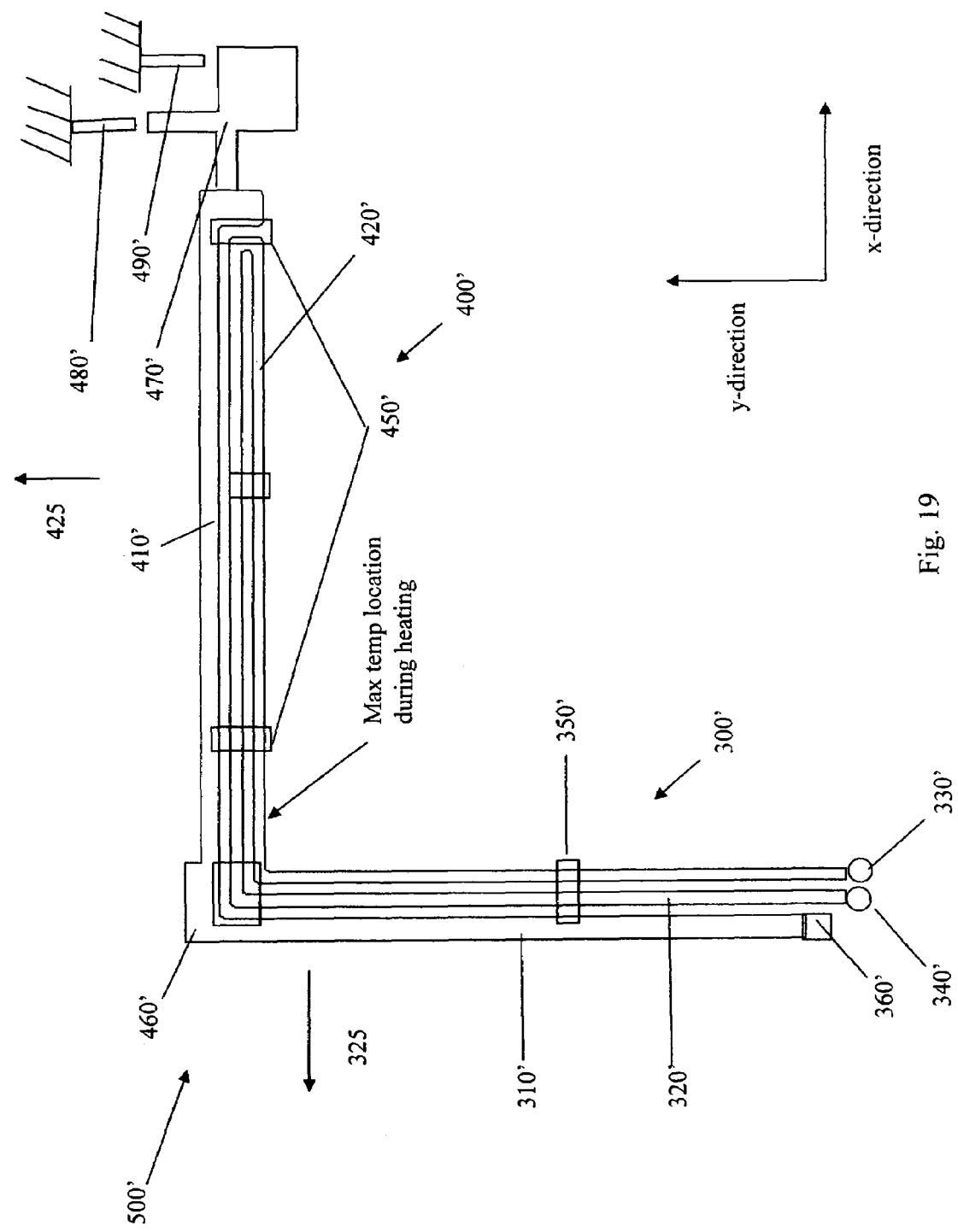

In each of the previous embodiments, an electrical signal is presumed to flow along the cantilevered beam to a contact located beyond the tip of the beam. However, it is also envisioned to configure the MEMS hysteretic device such that an electrical signal flows between two contacts located beyond the MEMS hysteretic device itself. Such an exemplary embodiment 500' is illustrated in FIG. 19. MEMS hysteretic device 500' is similar to MEMS hysteretic device 500 illustrated in FIG. 3, except for the shape and disposition of contacts 470 and 480. As shown in FIG. 19, a contact 470' is formed at the end of beam segment 400', and adjacent to two additional contacts 480' and 490', which are affixed to the substrate. The contact 470' is shaped such that it also has a pair of tabs 475' and 476' which are directly adjacent to contacts 480' and 490'.

The operation of MEMS hysteretic device 500' is illustrated in FIGS. 20*a* and 20*b*. When MEMS hysteretic device 500' is open, as shown in FIG. 20*a*, contact tabs 475' and 476' are disposed adjacent to, but not touching, contacts 480' and 490'. When the MEMS hysteretic device 500' is closed, as shown in FIG. 20*b*, the tabs 475' and 476' of contact 470' form an electrical connection between contacts 480' and 490'. The closing motion may be achieved using the hysteretic trajectory shown, for example, in FIGS. 4 and 5. Therefore, when MEMS hysteretic device 500' is closed, the electrical signal can flow between the contact 480' and 490', through contact 470', without having to flow along segmented beams 310' or 410'. Therefore, the material from which segmented beams 310' and 410' are formed may be chosen without regard to its electrical properties.

While various details have been described in conjunction with the exemplary implementations outlined above, various alternatives, modifications, variations, improvements, and/or substantial equivalents, whether known or that are or may be presently unforeseen, may become apparent upon reviewing the foregoing disclosure. For example, while MEMS hysteretic thermal actuators are described which have two segments, it should be understood that any number of additional segments may also be used. Furthermore, although the cantilevers are described as having straight segments, it should be understood that this is exemplary only, and that the cantilever may also have an arcuate shape. While the embodiments described above relate to a microelectromechanical actuator, it should be understood that the techniques and designs described above may be applied to any of a number of other microelectromechanical devices, such as valves and switches. Accordingly, the exemplary implementations set forth above, are intended to be illustrative, not limiting.

What is claimed is:

1. A hysteretic micromechanical device, comprising:
    a cantilever coupled to a fixed anchor point on a substrate, which moves in at least two substantially different directions during a single heating phase; and
    a driving means coupled to the cantilever, configured to move the cantilever in a first trajectory during the heating phase and a second, substantially different trajectory during a cooling phase, wherein the first trajectory and the second trajectory pass through different points in space.

2. The hysteretic micromechanical device of claim 1, wherein the cantilever further comprises:
    a first segment which bends in substantially a first direction about the fixed anchor point during the single heating phase; and
    at least one second segment which bends in substantially a second direction about a joint which couples the second segment to the first segment during the same heating phase.

3. The hysteretic micromechanical device of claim 2, wherein the joint couples the second segment to the first segment at an angle of greater than or equal to about zero degrees and less than or equal to about ninety-degrees.

4. The hysteretic micromechanical device of claim 2, wherein the first direction and the anchor point define a first motion plane and the second direction and the joint define a second motion plane, and the first motion plane is substantially orthogonal to the second motion plane.

5. The hysteretic micromechanical device of claim 1, wherein the wherein the first trajectory and the second trajectory have different lengths.

6. The hysteretic micromechanical device of claim 5, wherein the driving means comprises an electrical circuit which can carry electrical current, and wherein the driving means is tethered to the first and second segments by at least two dielectric tethers.

7. The hysteretic micromechanical device of claim 5, further comprising a heater element disposed adjacent to the first drive beam and the second drive beam, but not mechanically coupled to the first drive beam or the second drive beam.

8. The hysteretic micromechanical device of claim 5, wherein the first and second drive beams comprise a higher coefficient of thermal expansion material, and the first segment and the second segment comprise a lower coefficient of thermal expansion material.

9. The hysteretic micromechanical device of claim 8, further comprising a dielectric layer disposed between the first and second drive beams and the first and second segments, wherein a current is driven through the first and second drive beams and the first and second segments, to heat the hysteretic micromechanical device.

10. The hysteretic micromechanical device of claim 8, further comprising a heater element disposed adjacent to the first drive beam and the second drive beam.

11. The hysteretic micromechanical device of claim 5, wherein the first drive beam and the second drive beam are thermally conductive, and are thermally coupled, but not mechanically coupled, to a heater element.

12. A method of operating the hysteretic micromechanical device of claim 5, comprising:

heating the driving means;
bending the first segment substantially about the fixed anchor point;
bending the second segment substantially about the joint;
cooling the first drive beam faster than the second drive beam, so that the first segment begins relaxing before the second segment.

13. The method of claim 12, further comprising at least one of:
applying a voltage to the driving means; and
applying heat to the driving means.

14. The method of claim 12, further comprising closing an electrical switch by cooling the driving means.

15. A hysteretic micromechanical device, comprising:
a cantilever which moves in at least two substantially different directions; and
a driving means coupled to the cantilever, configured to move the cantilever in a first trajectory along the different direction while engaging a latch and a second, substantially different trajectory while disengaging the latch, wherein the two substantially different directions are orthogonal.

16. A method of manufacturing a hysteretic micromechanical device comprising:
forming a cantilever coupled to a fixed anchor point on a sub substrate which moves in at least two substantially different directions during a single heating phase; and
forming a driving means coupled to the cantilever, which is configured to move in a first trajectory during the heating phase and a second, substantially different trajectory during a cooling phase, wherein the first trajectory and the second trajectory pass through different points in space.

17. The method of claim 16, wherein forming the cantilever further comprises:
forming a first segment which bends in substantially a first direction about a fixed anchor point; and
forming a second segment which bends in substantially a second direction about a joint which couples the second segment to the first segment.

18. The method of claim 16, wherein forming the driving means further comprises:
forming a first drive beam disposed adjacent to the first segment which expands relative to the first segment; and
forming a second drive beam disposed adjacent to the second segment, which expands relative to the second segment.

19. The method of claim 18, further comprising coupling the first drive beam to the first segment with at least one tether and coupling the second drive beam to the second segment with at least another tether.

20. The method of claim 17, further comprising coupling the second segment to the first segment with the joint at an angle of greater than or equal to about zero degrees and less than or equal to about ninety degrees.

21. The method of claim 17, wherein forming the second segment comprises forming the second segment such that the second direction and the joint define a second motion plane, which is substantially orthogonal to a first motion plane defined by the first direction and the fixed point.

22. The method of claim 18, wherein forming the first and the second drive beams comprises forming the first and the second drive beams of material having a coefficient of thermal expansion which is high relative to a coefficient of thermal expansion of a material of the first and the second segments.

23. The method of claim 18, further comprising disposing a heater element adjacent to the first drive beam and the second drive beam.

24. The method of claim 18, further comprising forming an electrical circuit from the first drive beam and the second drive beam.

25. The method of claim 16, further comprising forming a contact which makes an electrical connection between at least one of the cantilever and another contact affixed to a stationary surface and two contacts affixed to a stationary surface.

* * * * *